US012808090B2

(12) United States Patent
Shenoy

(10) Patent No.: US 12,808,090 B2
(45) Date of Patent: *Nov. 24, 2026

(54) FINE FIBERS MADE WITH LOW TEMPERATURE CROSSLINKING

(71) Applicant: Donaldson Company, Inc., Bloomington, MN (US)

(72) Inventor: Suresh Laxman Shenoy, Bloomington, MN (US)

(73) Assignee: Donaldson Company, Inc., Bloomington, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/816,888

(22) Filed: Aug. 27, 2024

(65) Prior Publication Data

US 2024/0417890 A1 Dec. 19, 2024

Related U.S. Application Data

(63) Continuation of application No. 18/105,163, filed on Feb. 2, 2023, now Pat. No. 12,104,287, which is a continuation of application No. 17/513,477, filed on Oct. 28, 2021, now Pat. No. 11,578,431, which is a continuation of application No. 16/091,659, filed as application No. PCT/US2017/026396 on Apr. 6, 2017, now Pat. No. 11,186,928.

(60) Provisional application No. 62/318,951, filed on Apr. 6, 2016.

(51) Int. Cl.

| | |
|---|---|
| ***D01F 6/56*** | (2006.01) |
| ***C08J 7/04*** | (2020.01) |
| ***C08L 39/08*** | (2006.01) |
| ***D01D 5/00*** | (2006.01) |
| ***D01F 1/10*** | (2006.01) |
| ***D06M 13/11*** | (2006.01) |
| ***D06M 15/356*** | (2006.01) |
| *D01F 6/90* | (2006.01) |

(52) U.S. Cl.

CPC .............. *D01F 6/56* (2013.01); *C08J 7/0427* (2020.01); *C08L 39/08* (2013.01); *D01D 5/003* (2013.01); *D01F 1/10* (2013.01); *D06M 13/11* (2013.01); *D06M 15/3562* (2013.01); *C08J 2339/08* (2013.01); *C08J 2463/00* (2013.01); *C08L 2205/16* (2013.01); *D01F 6/90* (2013.01)

(58) Field of Classification Search

None

See application file for complete search history.

(56) References Cited

U.S. PATENT DOCUMENTS

| | | | | |
|---|---|---|---|---|
| 6,673,136 | B2 | 1/2004 | Gillingham et al. | |
| 6,716,274 | B2 | 4/2004 | Gogins et al. | |
| 6,743,273 | B2 | 6/2004 | Chung et al. | |
| 6,746,517 | B2 | 6/2004 | Benson et al. | |
| 6,800,117 | B2 | 10/2004 | Barris et al. | |
| 6,875,256 | B2 | 4/2005 | Gillingham et al. | |
| 7,316,723 | B2 | 1/2008 | Chung et al. | |
| 10,300,415 | B2 | 5/2019 | Shenoy et al. | |
| 11,186,928 | B2 * | 11/2021 | Shenoy | C08J 7/0427 |
| 11,578,431 | B2 | 2/2023 | Shenoy | |
| 12,104,287 | B2 * | 10/2024 | Shenoy | C08L 39/08 |
| 2011/0151738 | A1 | 6/2011 | Moore et al. | |
| 2012/0178332 | A1 | 7/2012 | Uchida | |
| 2013/0068687 | A1 | 3/2013 | Shenoy | |
| 2014/0256873 | A1 * | 9/2014 | Shenoy | D01F 1/10 525/420 |
| 2019/0153627 | A1 | 5/2019 | Shenoy | |
| 2022/0049379 | A1 | 2/2022 | Shenoy | |
| 2023/0257910 | A1 | 8/2023 | Liu | |

FOREIGN PATENT DOCUMENTS

| | | | | |
|---|---|---|---|---|
| CN | 1543487 | A | | 11/2004 |
| CN | 103874793 | A | | 6/2014 |
| CN | 105143527 | A | | 12/2015 |
| JP | 2009291754 | A | | 12/2009 |
| JP | 2014234581 | A | | 12/2014 |
| KR | 2014006358 | A | * | 1/2014 |
| KR | 20140006358 | A | | 1/2014 |
| RU | 1526306 | C | | 12/1994 |
| RU | 2300543 | C2 | | 6/2007 |
| SU | 594219 | A1 | | 2/1978 |
| WO | 2011052175 | A1 | | 5/2011 |

(Continued)

OTHER PUBLICATIONS

International Preliminary Report on Patentability for International Application No. PCT/US2017/026396, mailed Oct. 18, 2018, 7 Pages.

(Continued)

*Primary Examiner* — Sanza L. McClendon

(74) *Attorney, Agent, or Firm* — Mueting Raasch Group

(57) ABSTRACT

The present disclosure provides a unique method of making a fine fiber that is formed from a composition including an epoxy and a polymer component including a 4-vinyl pyridine-containing polymer. The present disclosure also provides a unique method of coating a fine fiber with a composition including an epoxy and a polymer component including a 4-vinyl pyridine-containing polymer. The present disclosure further provides fine fibers wherein the entirety of the fiber is formed from a composition including an epoxy and a polymer component including a 4-vinyl pyridine-containing polymer. Also provided are filter media and filter substrates including the fine fibers.

20 Claims, 14 Drawing Sheets

(56) References Cited

FOREIGN PATENT DOCUMENTS

Figure 1A:
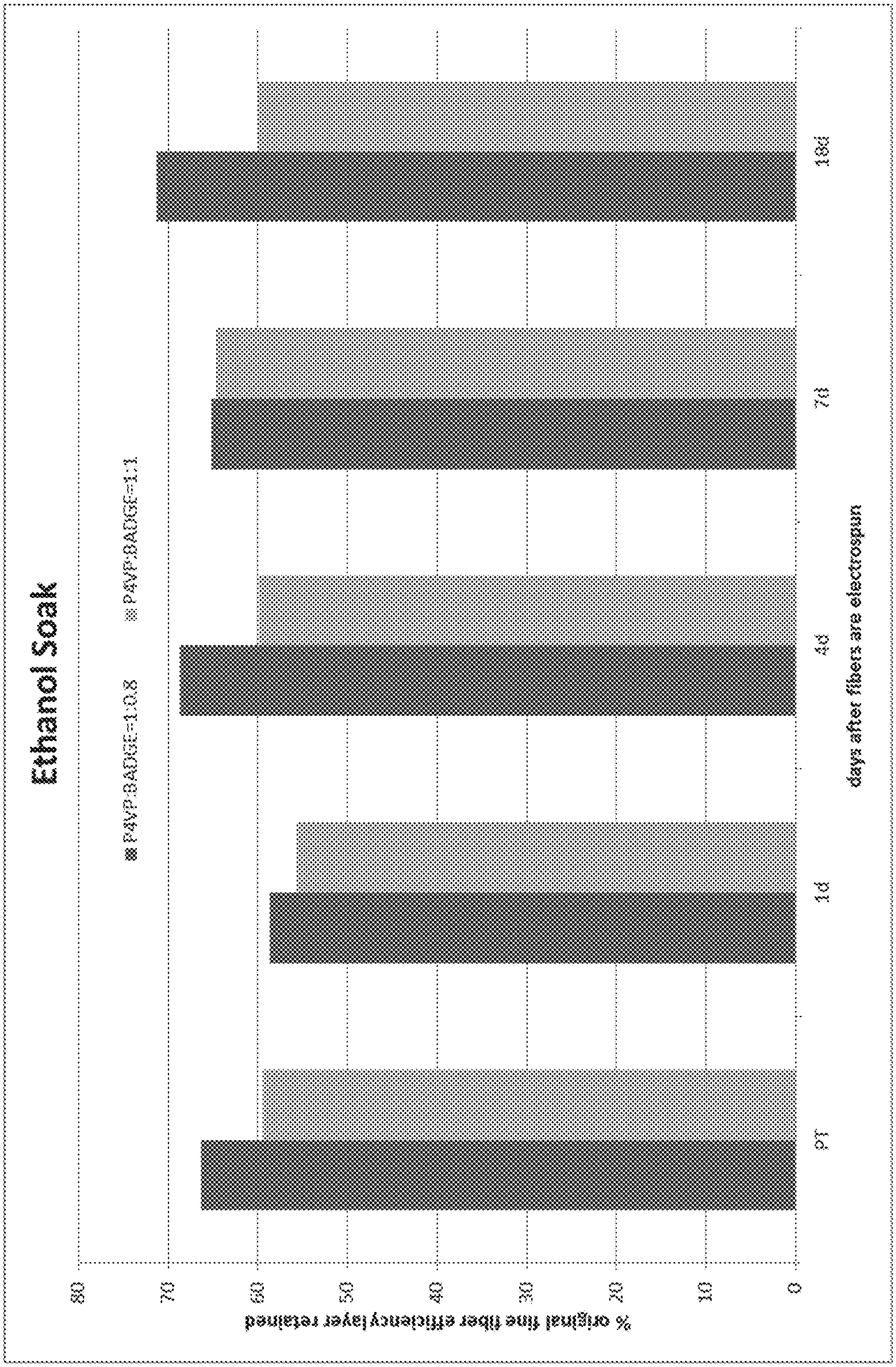

| | | | |
|---|---|---|---|
| WO | 2013043987 | A1 | 3/2013 |
| WO | 2014164130 | A1 | 10/2014 |

OTHER PUBLICATIONS

International Search Report and Written Opinion for International Application No. PCT/US2017/026396, mailed Jul. 6, 2017, 14 Pages.

Meng F., et al., "Epoxy Resin Cured with Poly(4-vinyl pyridine)," Journal of Materials Science, 2005, vol. 40, pp. 6367-6373, Published Online: Oct. 5, 2005.

Xue G., et al., "A Fourier Transform Infrared Spectroscopic Study of the Reaction Between Poly (Vinylpyridine)s and Epoxy Compounds," Chinese Journal of Polymer Science, 1987, vol. 5, No. 2, pp. 133-140.

Yevtushenko G.T., et al., "Kinetics of Hardening of ED-5 Epoxy Resins with Anhydrides in the Presence of 2.4,6-Tris-(Dimethylaminomethyl)phenol," Polymer Science U.S.S.R, Pergamon Press, Oxford, Jan. 1, 1974, vol. 16, No. 6, pp. 1557-1562, DOI:10.1016/0032-3950(74)90421-3, ISSN: 0032-3950, XP026042340.

* cited by examiner

FINE FIBERS MADE WITH LOW TEMPERATURE CROSSLINKING

CONTINUING APPLICATION DATA

This application is a continuation of U.S. patent application Ser. No. 18/105,163, filed Feb. 2, 2023, which is a continuation of U.S. patent application Ser. No. 17/513,477, filed Oct. 28, 2021, issued as U.S. Pat. No. 11,578,431 on Feb. 14, 2023, which is a continuation of U.S. patent application Ser. No. 16/091,659, filed Oct. 5, 2018, issued as U.S. Pat. No. 11,186,928 on Nov. 30, 2021, which is the § 371 U.S. National Stage of International Application No. PCT/US2017/026396, filed Apr. 6, 2017, which claims the benefit of U.S. Provisional Application Ser. No. 62/318,951, filed Apr. 6, 2016, which are incorporated by reference herein in their entireties.

BACKGROUND OF THE DISCLOSURE

Fine fiber technologies that contemplate polymeric materials mixed or blended with a variety of other substances are known. While many of these fine fiber materials have adequate performance for a number of filtration end uses, in applications with extremes of temperature and/or humidity, improvements in fiber processing and production are still needed.

SUMMARY

The present disclosure provides a unique method of making a fine fiber or a coating for a fine fiber that is formed from a composition including an epoxy and a polymer component. The epoxy is at least difunctional. The polymer component includes a 4-vinyl pyridine-containing polymer. In some embodiments, the composition includes a solvent that does not complex with 4-vinyl pyridine. In some embodiments, the polymer component is combined with the epoxy without the application of heat. The composition can further include a solvent, and at least a portion of the solvent can be removed during fiber formation or coating.

The present disclosure further provides fine fibers wherein the entirety of the fiber is formed from a composition including an epoxy and a polymer component including a 4-vinyl pyridine-containing polymer.

The present disclosure also provides filter media including the fine fibers described herein.

Herein, a "fine" fiber has an average fiber diameter of less than 10 microns. Typically, this means that a sample of a plurality of fibers of the present disclosure has an average fiber diameter of less than 10 microns. In certain embodiments, such fibers have an average diameter of up to 5 microns, up to 2 microns, up to 1 micron, up to 0.8 micron, or up to 0.5 micron. In certain embodiments, such fibers have an average diameter of at least 0.05 micron, or at least 0.1 micron.

Herein "room temperature" is 62° F. to 78° F. or, more preferably, 65° F. to 75° F. In certain embodiments, room temperature is 72° F.

The terms "comprises" and variations thereof do not have a limiting meaning where these terms appear in the description and claims. Such terms will be understood to imply the inclusion of a stated step or element or group of steps or elements but not the exclusion of any other step or element or group of steps or elements. By "consisting of" is meant including, and limited to, whatever follows the phrase "consisting of." Thus, the phrase "consisting of" indicates that the listed elements are required or mandatory, and that no other elements may be present. By "consisting essentially of" is meant including any elements listed after the phrase, and limited to other elements that do not interfere with or contribute to the activity or action specified in the disclosure for the listed elements. Thus, the phrase "consisting essentially of" indicates that the listed elements are required or mandatory, but that other elements are optional and may or may not be present depending upon whether or not they materially affect the activity or action of the listed elements.

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the disclosure.

In this application, terms such as "a," "an," and "the" are not intended to refer to only a singular entity, but include the general class of which a specific example may be used for illustration. The terms "a," "an," and "the" are used interchangeably with the term "at least one."

The phrases "at least one of" and "comprises at least one of" followed by a list refers to any one of the items in the list and any combination of two or more items in the list.

As used herein, the term "or" is generally employed in its usual sense including "and/or" unless the content clearly dictates otherwise. The term "and/or" means one or all of the listed elements or a combination of any two or more of the listed elements.

Also herein, all numbers are assumed to be modified by the term "about" and preferably by the term "exactly." As used herein in connection with a measured quantity, the term "about" refers to that variation in the measured quantity as would be expected by the skilled artisan making the measurement and exercising a level of care commensurate with the objective of the measurement and the precision of the measuring equipment used.

Also herein, the recitations of numerical ranges by endpoints include all numbers subsumed within that range as well as the endpoints (e.g., 1 to 5 includes 1, 1.5, 2, 2.75, 3, 3.80, 4, 5, etc.). Herein, "up to" a number (e.g., up to 50) includes the number (e.g., 50).

All headings are for the convenience of the reader and should not be used to limit the meaning of the text that follows the heading, unless so specified.

The above summary of the present disclosure is not intended to describe each disclosed embodiment or every implementation of the present disclosure. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

DRAWINGS

The disclosure may be more completely understood in connection with the following drawings.

Figure 1B:
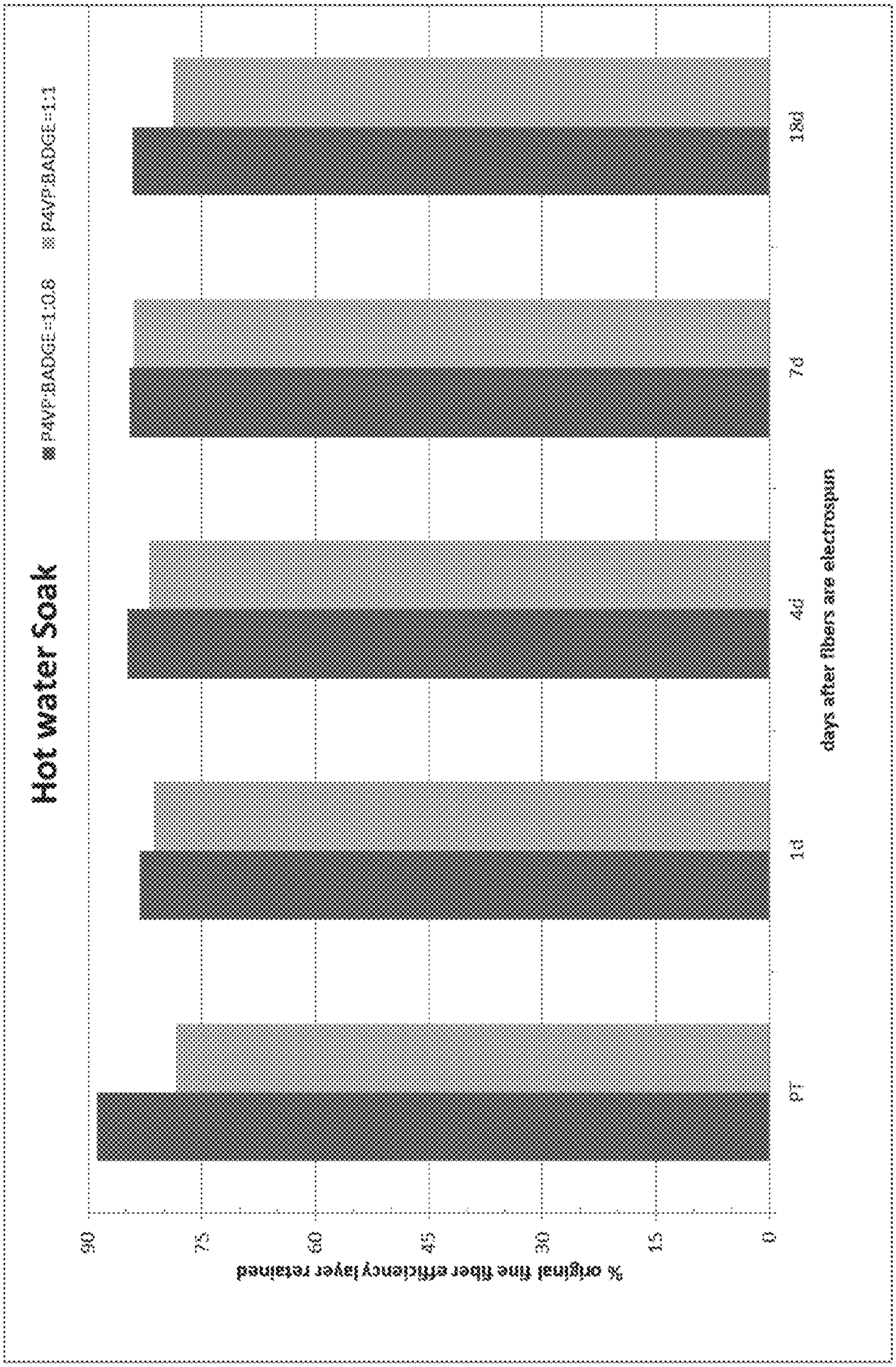

FIG. 1 (A, B) graphically shows the fine fiber layer efficiency retained of the fine fibers and substrate obtained from Example 1 post-ethanol soak (FIG. 1A) or post-hot water soak (FIG. 1).

Figure 2A:
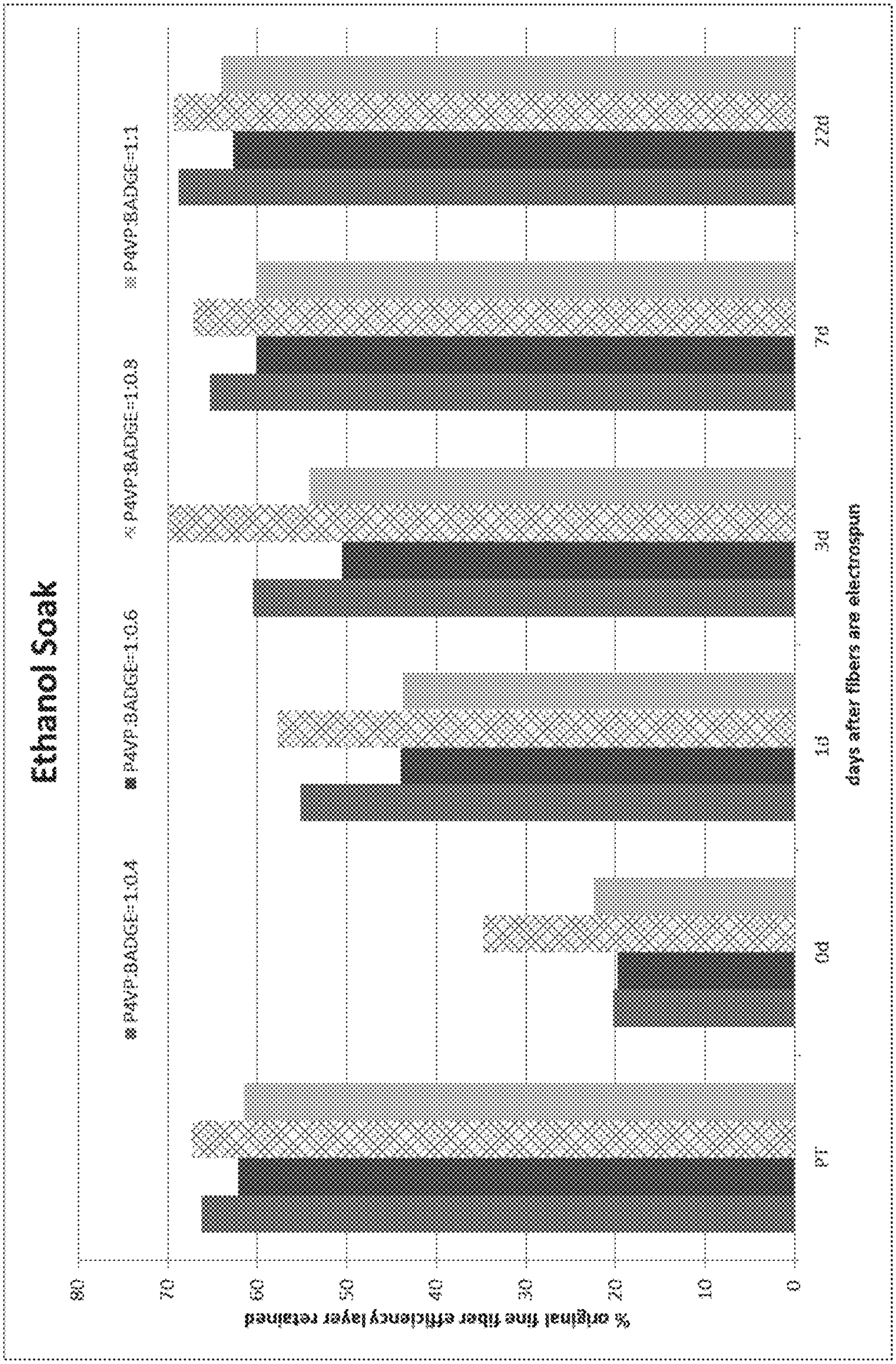
Figure 2B:
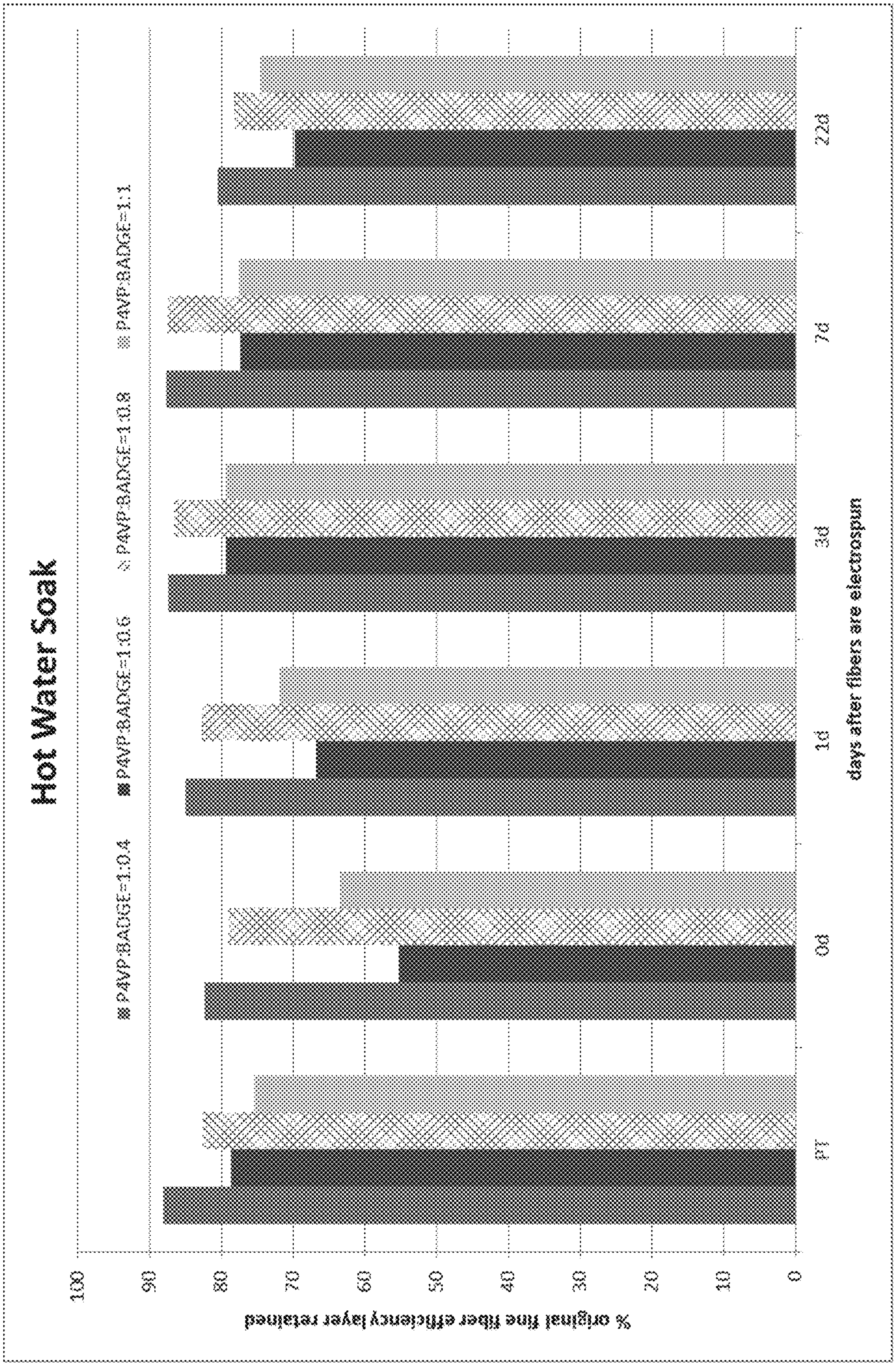

FIG. 2 (A, B) graphically shows the fine fiber layer efficiency retained of the fine fibers and substrate obtained from Example 2 post-ethanol soak (FIG. 2A) or post-hot water soak (FIG. 2B).

Figure 3A:
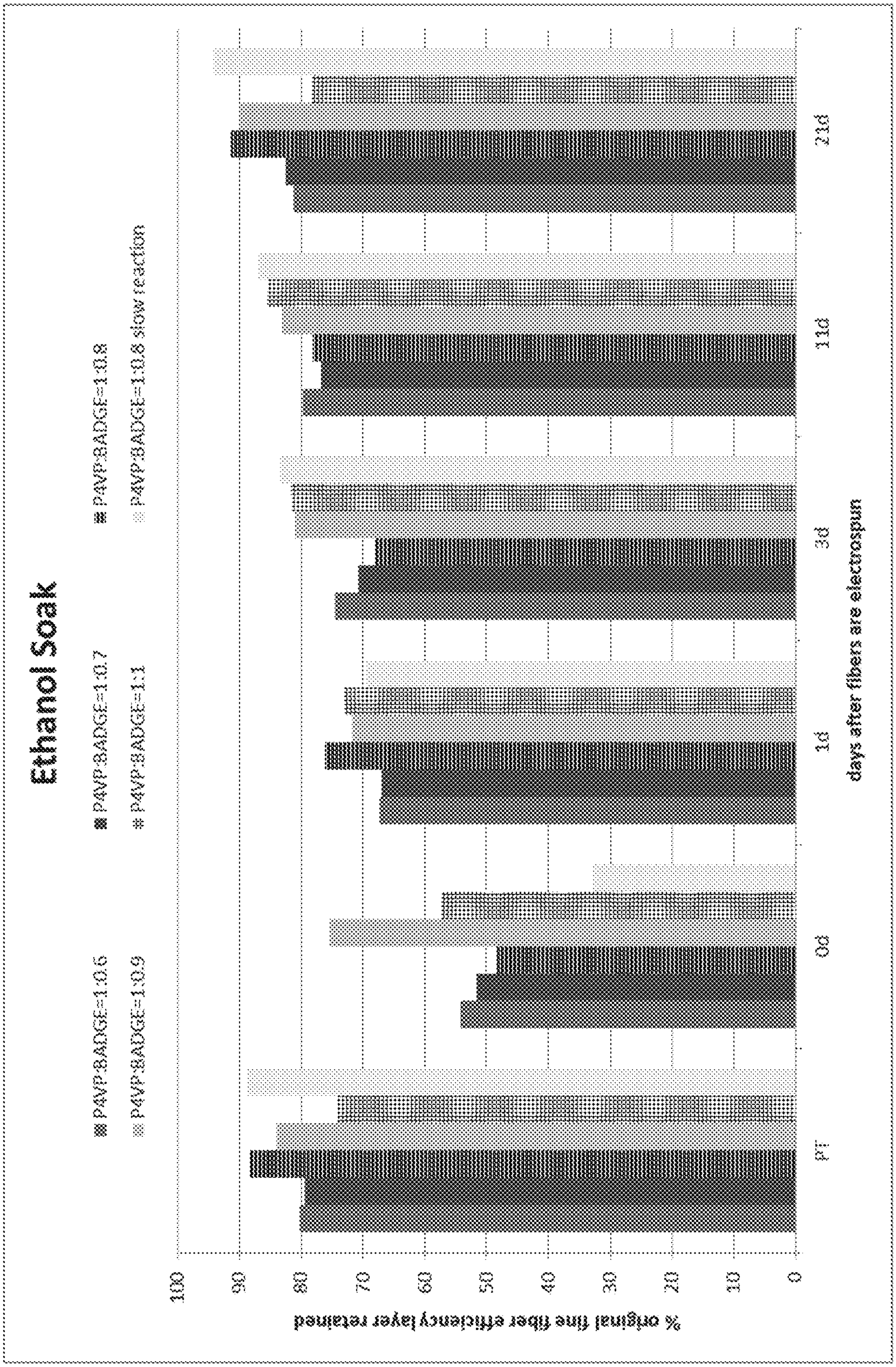
Figure 3B:
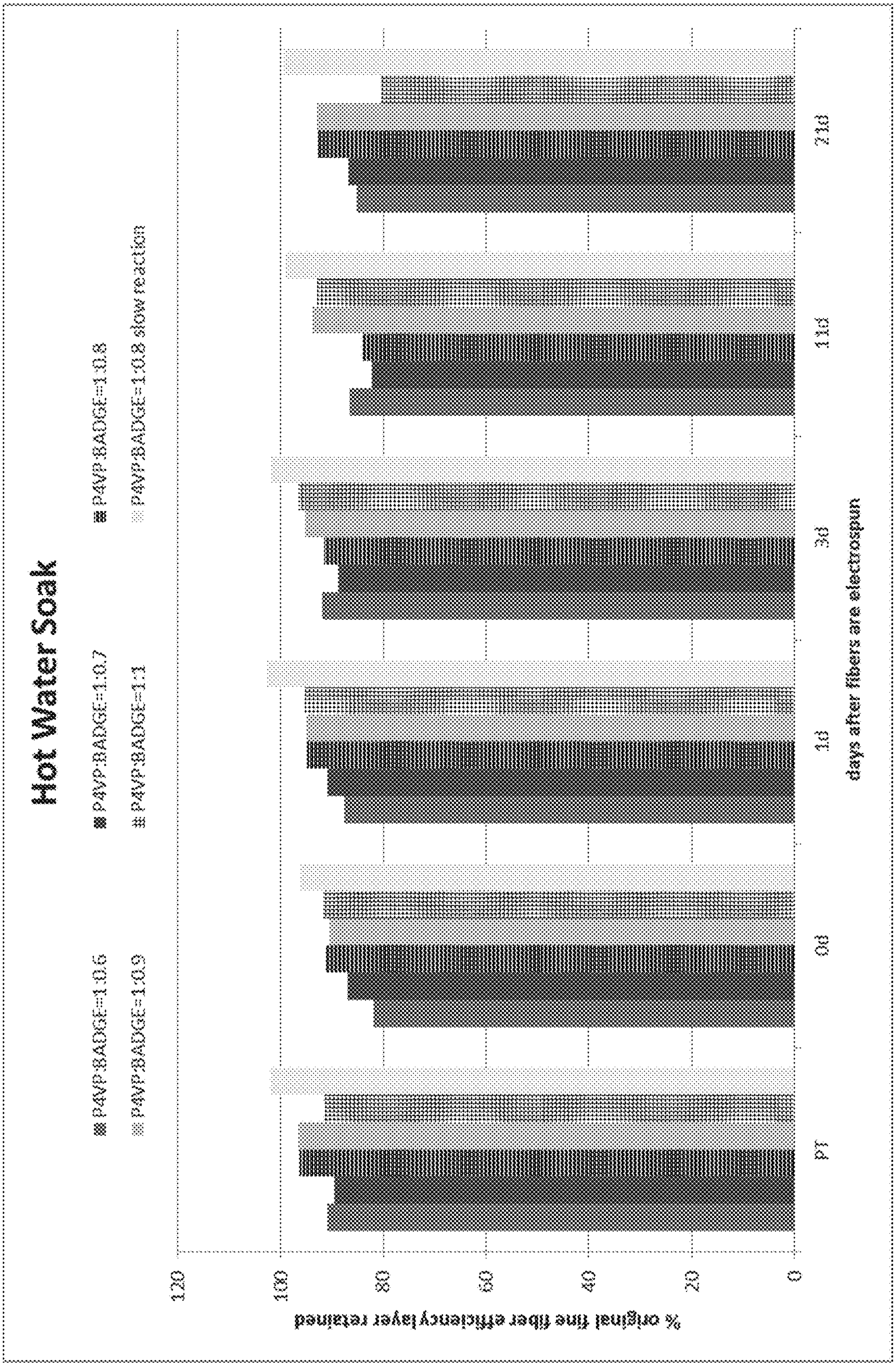

FIG. 3 (A, B) graphically shows the fine fiber layer efficiency retained of the fine fibers and substrate obtained from Example 3 post-ethanol soak (FIG. 3A) or post-hot water soak (FIG. 3B).

Figure 4A:
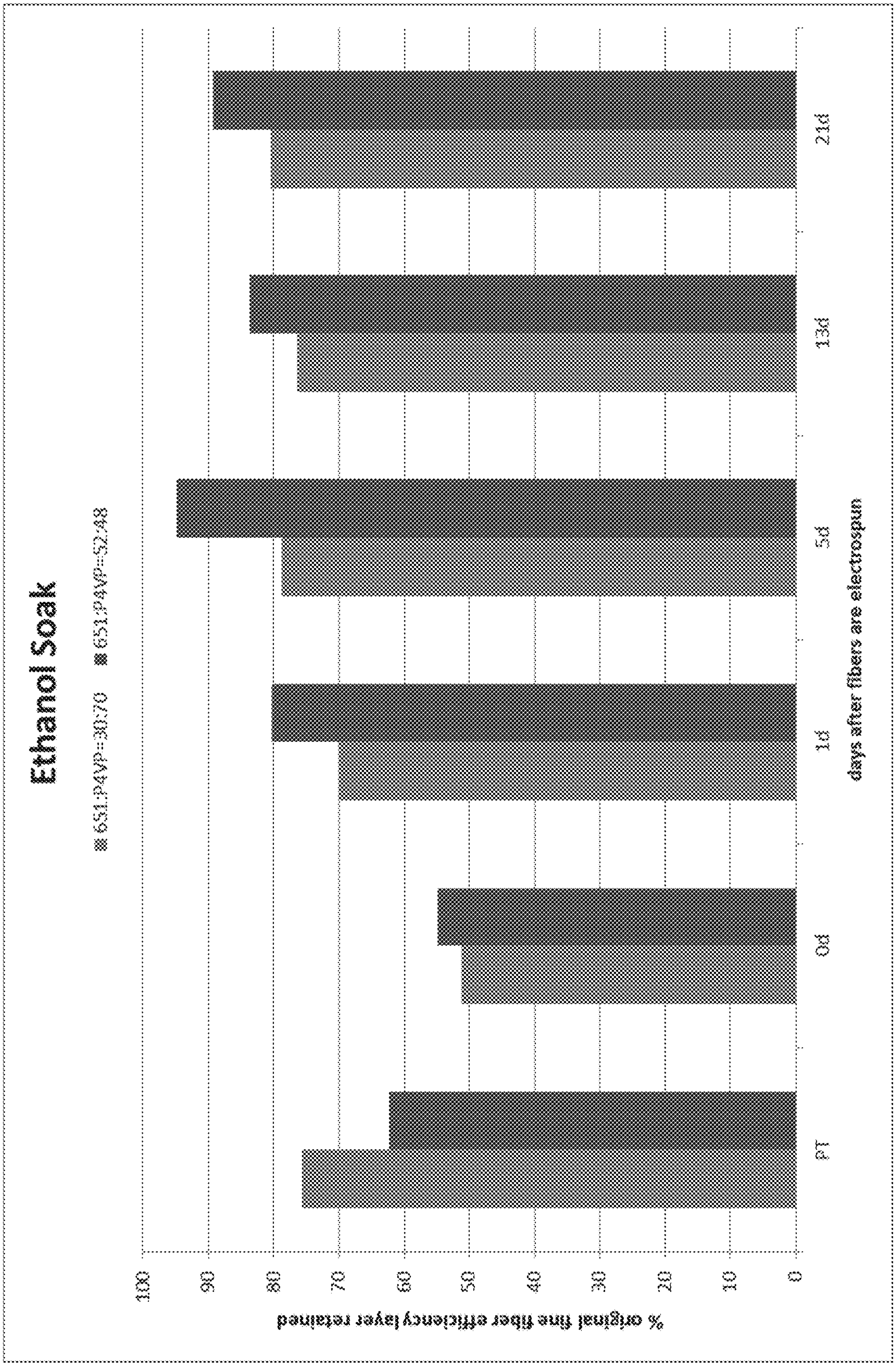
Figure 4B:
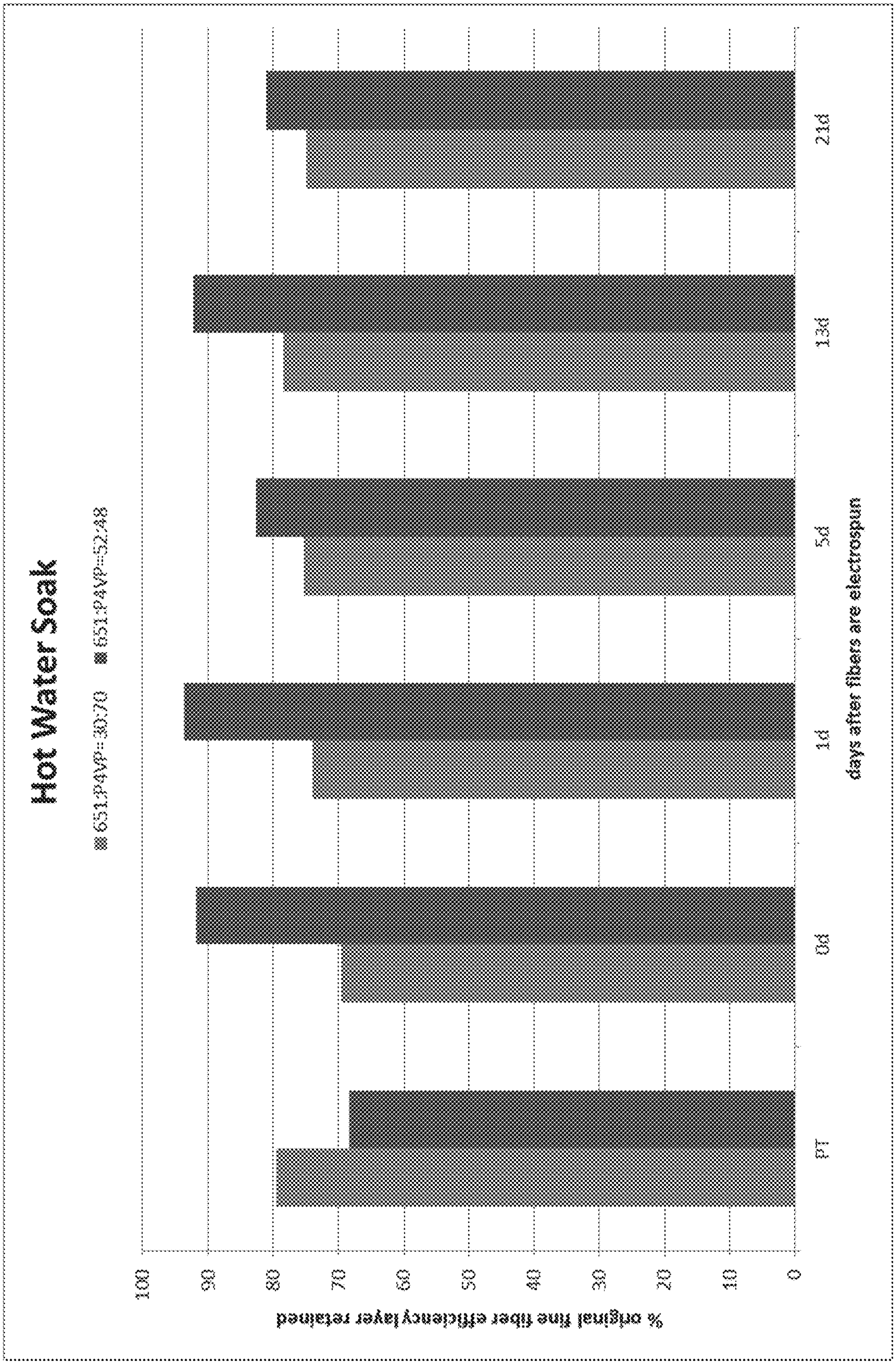

FIG. 4 (A, B) graphically shows the fine fiber layer efficiency retained of the fine fibers and substrate obtained from Example 4 post-ethanol soak (FIG. 4A) or post-hot water soak (FIG. 4B).

Figure 5A:
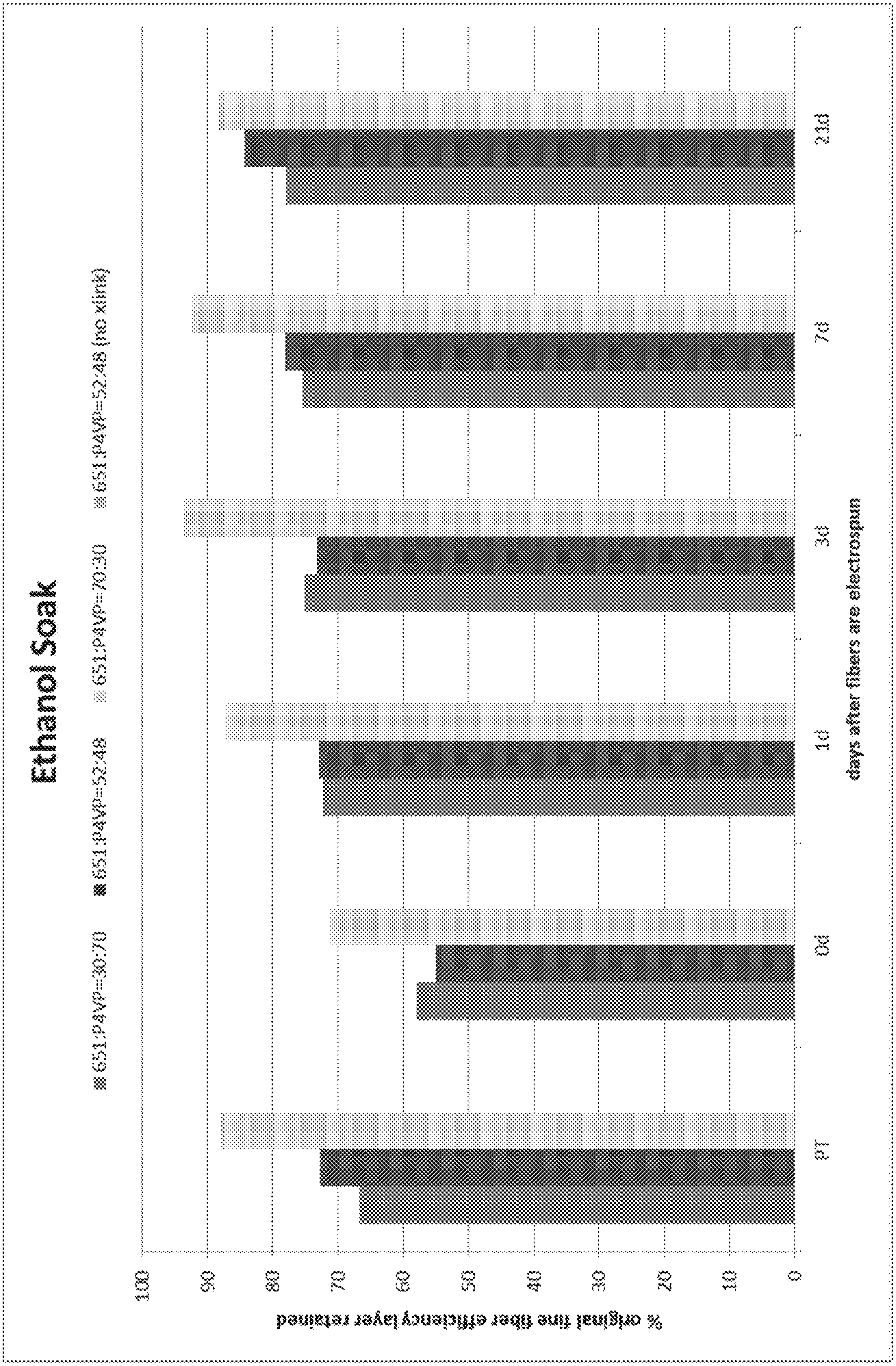
Figure 5B:
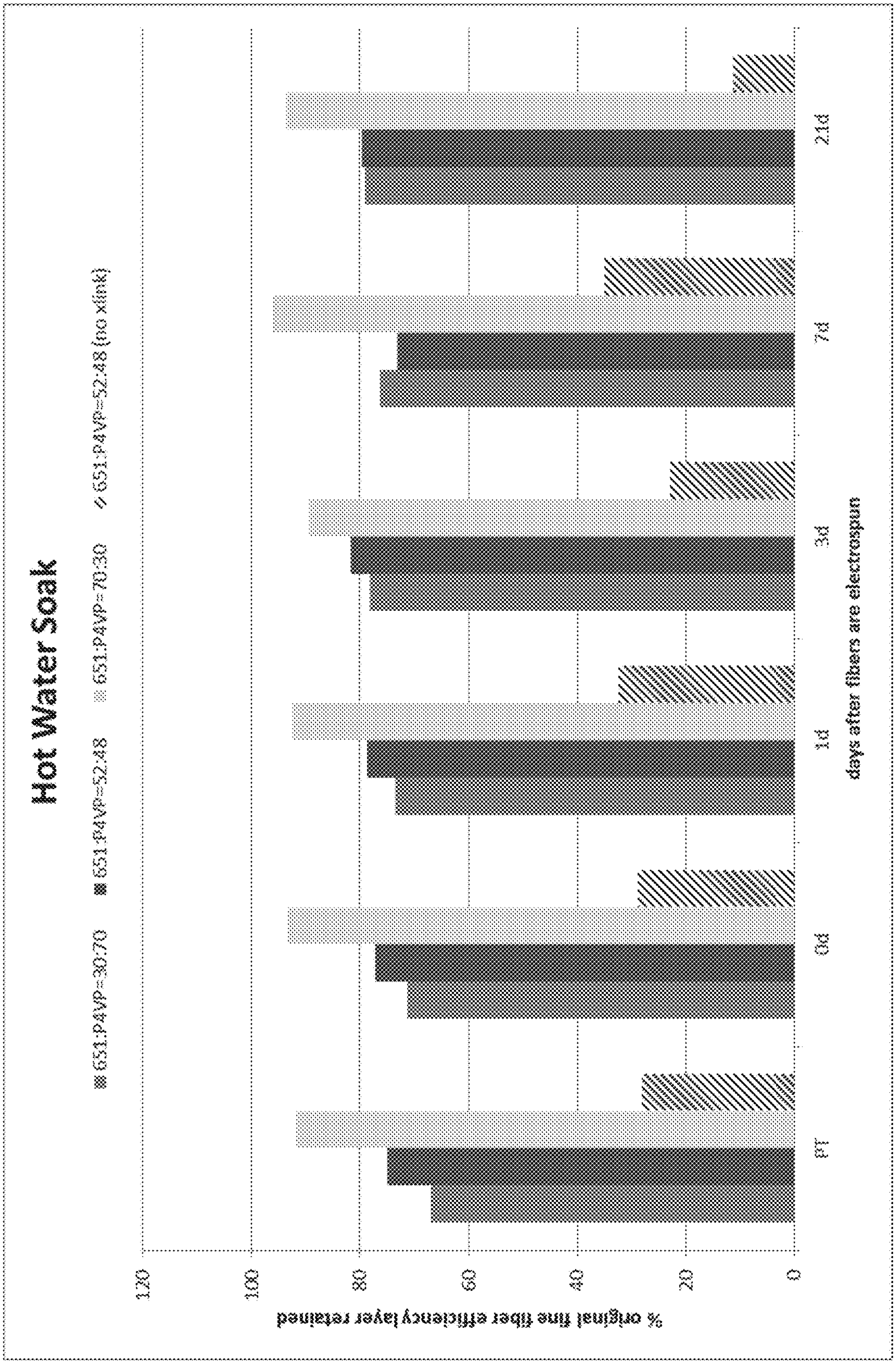

FIG. 5 (A, B) graphically shows the fine fiber layer efficiency retained of the fine fibers and substrate obtained from Example 5 post-ethanol soak (FIG. 5A) or post-hot water soak (FIG. 5B).

Figure 6A:
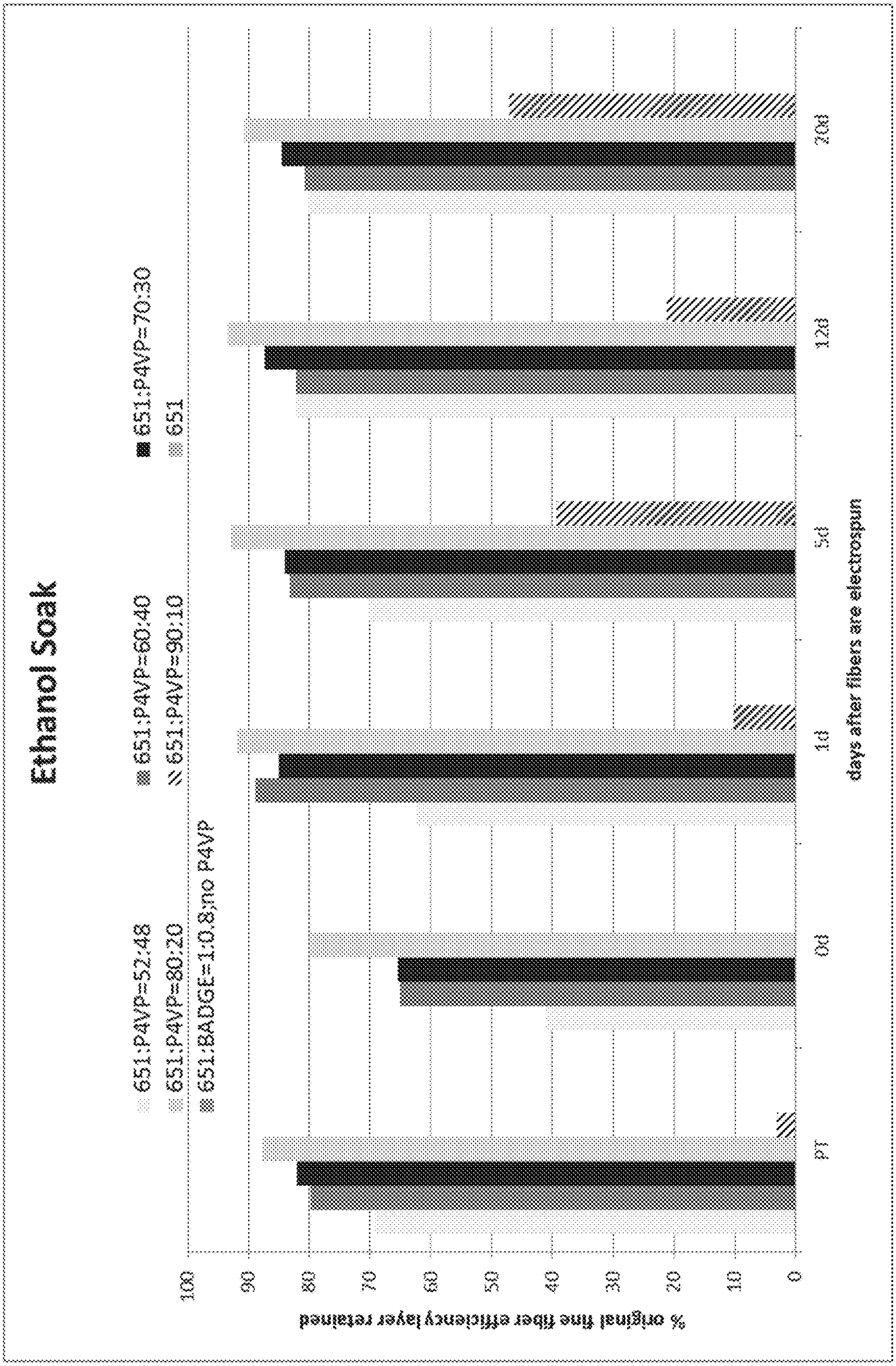
Figure 6B:
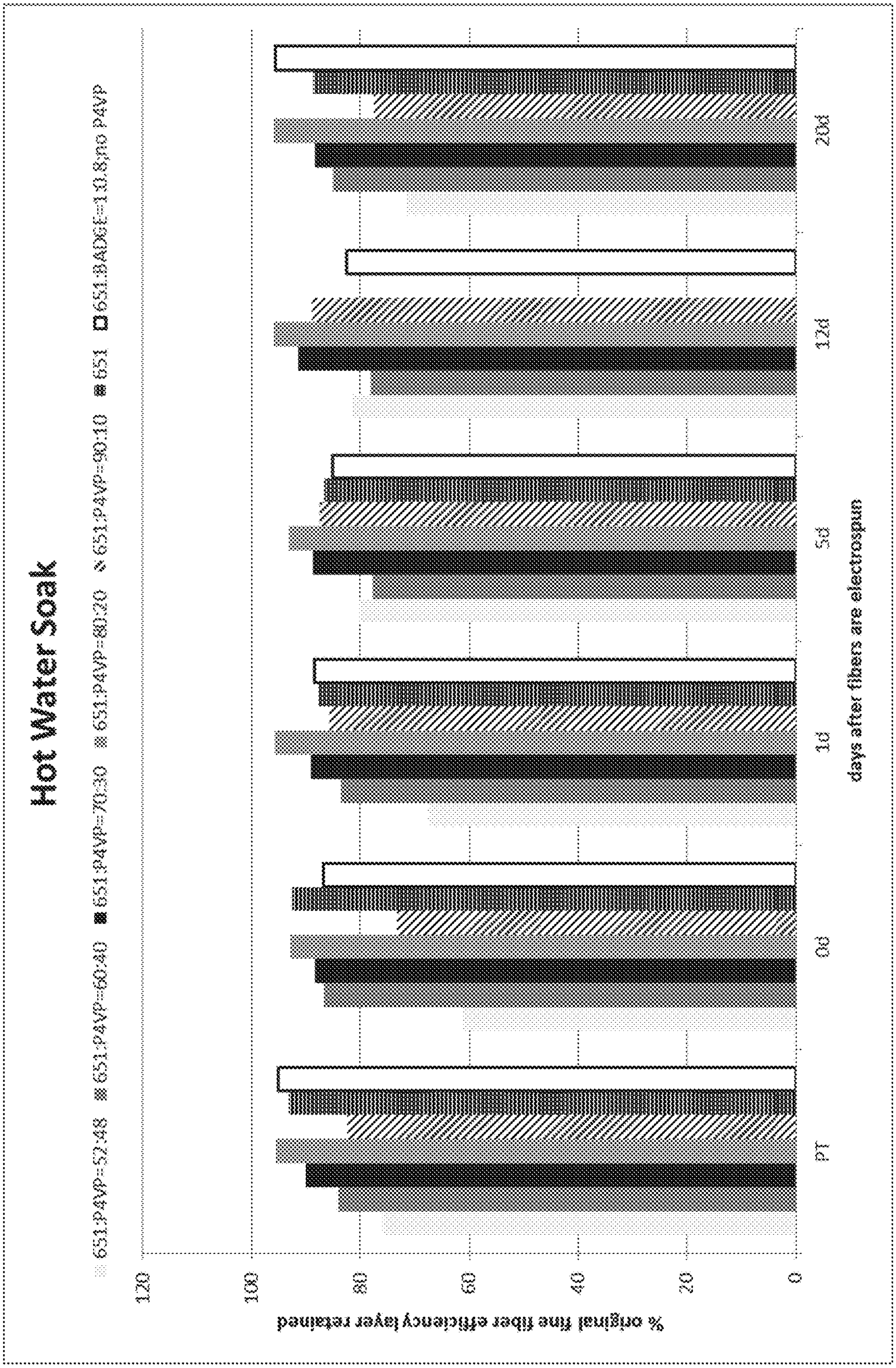

FIG. 6 (A, B) graphically shows the fine fiber layer efficiency retained of the fine fibers and substrate obtained from Example 6 post-ethanol soak (FIG. 6A) or post-hot water soak (FIG. 6B).

Figure 7A:
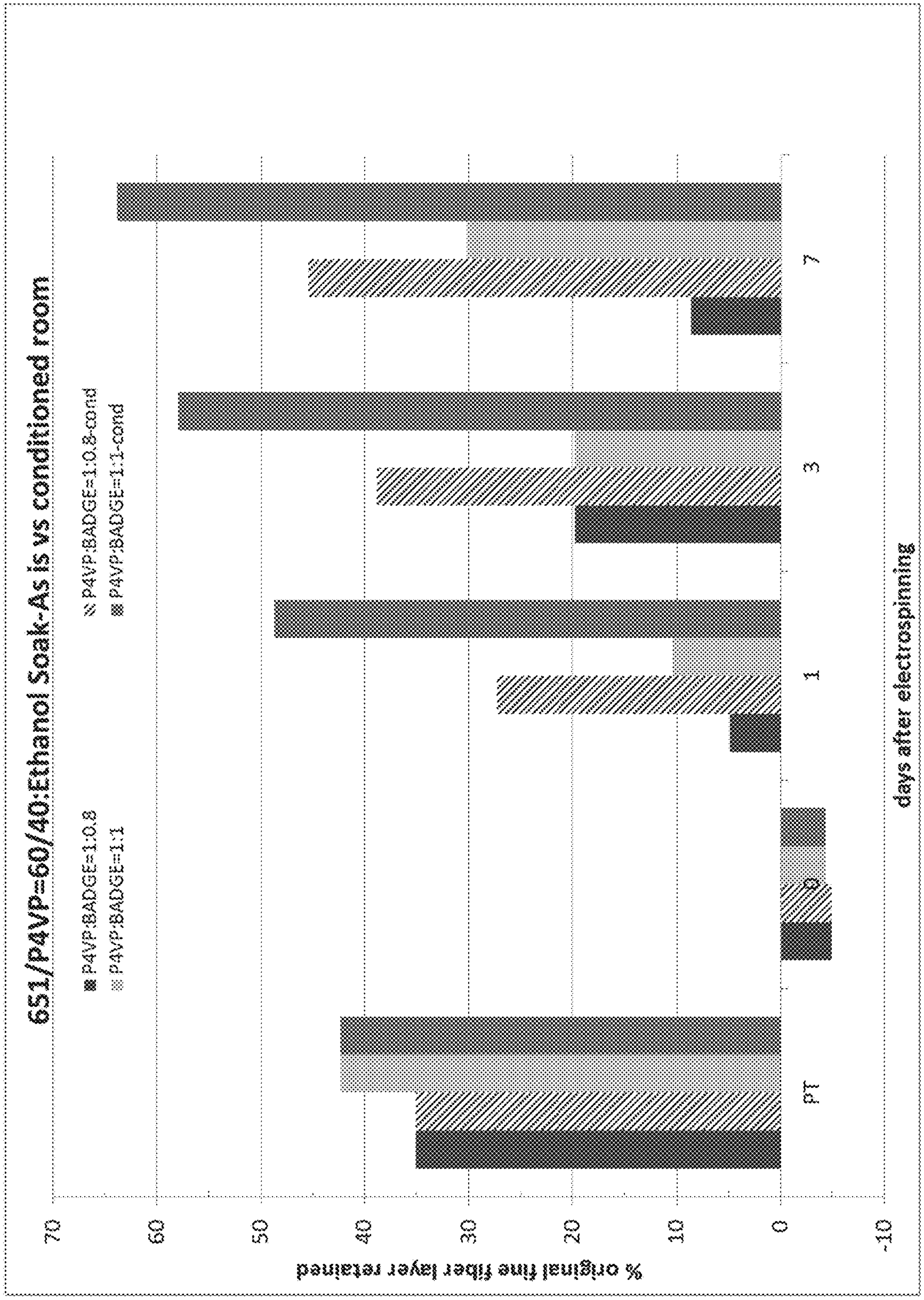
Figure 7B:
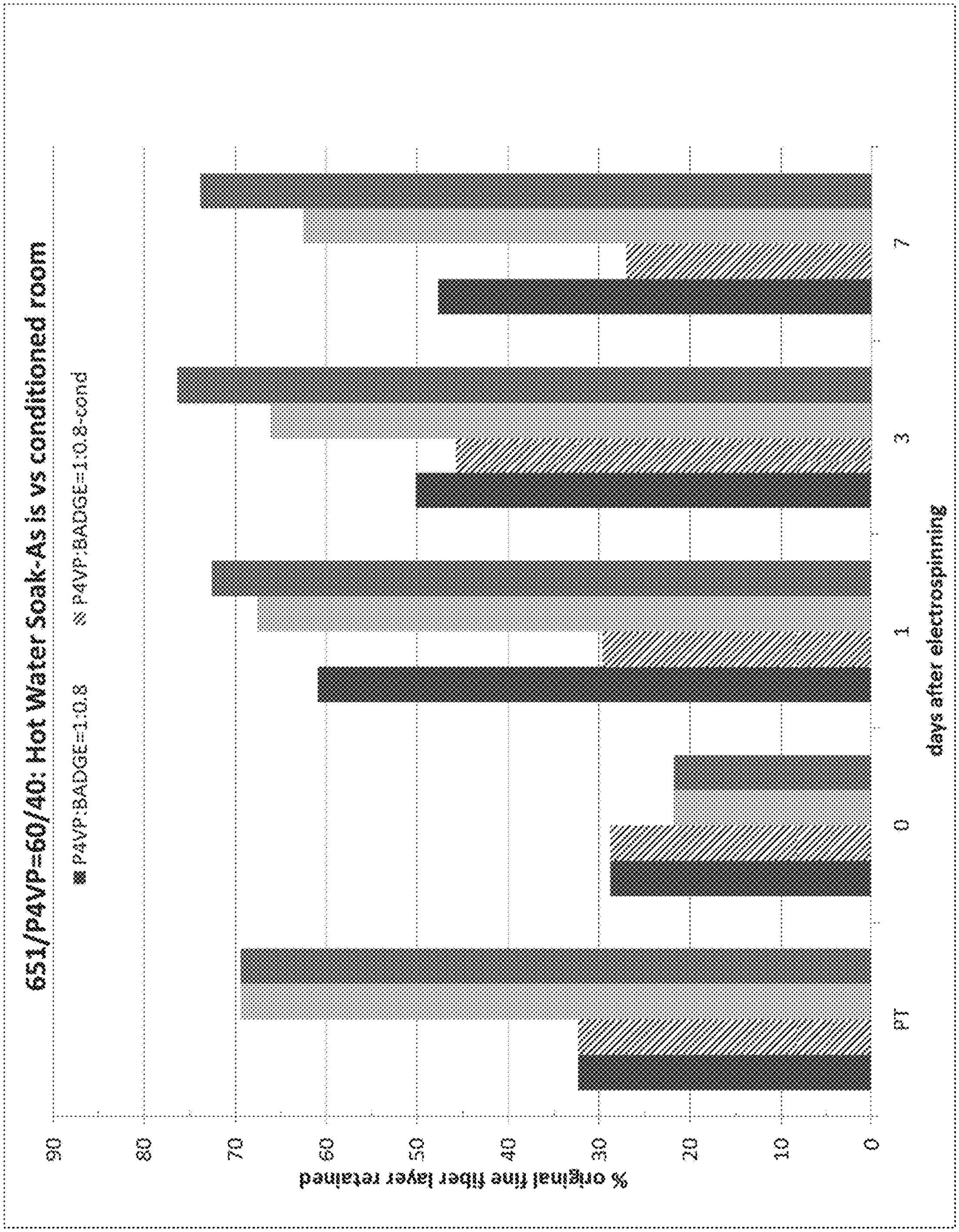

FIG. 7 (A, B) graphically shows the fine fiber layer efficiency retained of the fine fibers and substrate obtained from Example 7 post-ethanol soak (FIG. 7A) or post-hot water soak (FIG. 7B).

DETAILED DESCRIPTION OF ILLUSTRATIVE EMBODIMENTS

The present disclosure provides a unique method of making a fine fiber material that is formed from a polymer component and an epoxy. The polymer component includes a 4-vinyl pyridine-containing polymer. The epoxy is at least difunctional. In some embodiments, the polymer component, a solvent, and the epoxy are combined to form a composition. In some embodiments, a plurality of fibers can be formed from the composition. The entirety of each fiber can be prepared from the composition. In some embodiments, the composition can be used to coat a fine fiber.

In some embodiments, the composition includes a solvent that does not complex with 4-vinyl pyridine.

In some embodiments, the polymer component, the solvent, and the epoxy are combined, and a fiber is formed from or coated with the composition without increasing the temperature of the composition above 30° C.

Polymer Component

The term "polymer component," as used herein, includes a 4-vinyl pyridine-containing polymer. The polymer component optionally includes other fiber-forming polymer materials suitable for use in making fine fibers.

The 4-vinyl pyridine-containing polymer can be, for example, a poly(4-vinyl pyridine) homopolymer, a 4-vinyl pyridine copolymer, or mixtures thereof. Herein, the term "copolymer" includes polymers made from two or more different monomers and includes terpolymers, tetrapolymers, etc.

Any monomers that can be polymerized by free radical polymerization can be used as a comonomer for 4-vinyl pyridine in a 4-vinyl pyridine copolymer. For example, the 4-vinyl pyridine-containing polymer can be a copolymer with monomers including styrene, an alkyl(meth)acrylate, acrylonitrile, and combinations thereof. An alkyl(meth)acrylate includes an alkyl acrylate and an alkyl methacrylate.

Various 4-vinyl pyridine copolymers can include: a copolymer of styrene and 4-vinyl pyridine, a copolymer of an alkyl(meth)acrylate and 4-vinyl pyridine, and a copolymer of acrylonitrile and 4-vinyl pyridine. An alkyl(meth)acrylate can include, for example, methyl(meth)acrylate, ethyl(meth) acrylate, butyl(meth)acrylate, etc. Copolymers can be made by combining a 4-vinyl pyridine monomer with other monomers that are polymerized by free radical polymerization in a reaction mixture. For example, copolymers can be made by combining a 4-vinyl pyridine monomer with styrene, α-methyl styrene, styrene sulfonic acid, alkyl methacryaltes (e.g., methyl methacrylate, butyl methacrylate etc.), alkyl acrylates, (e.g., methyl acrylate, ethyl acrylate, butyl acrylate etc.), vinyl chloride, vinyl acetate, etc., or combinations thereof (e.g., mixtures or copolymers thereof), in a reaction mixture. For example, block copolymers can be made by combining poly(4-vinyl pyridine) with styrene, alkyl acrylates, alkyl methacrylates, etc., in a reaction mixture.

In some embodiments, the polymer component may contain, in addition to a 4-vinyl pyridine-containing polymer, other fiber-forming polymer materials suitable for use in making fine fibers. In some embodiments, these other fiber-forming polymer materials have a lower glass transition temperature ($T_g$) than the 4-vinyl pyridine-containing polymer. Examples include a nylon, a polyamide terpolymer, a polyvinyl butyral (PVB), a polyvinyl alcohol (PVA), a polyurethane, or combinations thereof (e.g., mixtures or copolymers thereof).

The term "nylon" is a generic name for all long chain synthetic polyamides. Typically, nylon nomenclature includes a series of numbers such as in nylon-6,6 which indicates that the starting materials are a $C_6$ diamine and a $C_6$ diacid (the first digit indicating a $C_6$ diamine and the second digit indicating a $C_6$ dicarboxylic acid compound). Another nylon can be made by the polycondensation of ε-caprolactam in the presence of a small amount of water. This reaction forms a nylon-6 (made from a cyclic lactam, also known as ε-aminocaproic acid) that is a linear polyamide. Further, nylon copolymers are also contemplated. Exemplary nylon materials include nylon-6, nylon-6,6, nylon-6,10, as well as terpolymers of nylon-6, nylon-6,6 and nylon-6,10; or combinations thereof (e.g., mixtures or copolymers thereof).

Copolymers can be made by combining various diamine compounds, various diacid compounds and various cyclic lactam structures in a reaction mixture and then forming the nylon with randomly positioned monomeric materials in a polyamide structure. For example, a nylon-6,6-6,10 material is a nylon manufactured from hexamethylene diamine and a $C_6$ and a $C_{10}$ blend of diacids. A nylon-6-6,6-6,10 is a nylon manufactured by copolymerization of ε-aminocaproic acid, hexamethylene diamine and a blend of a $C_6$ and a $C_{10}$ diacid material.

Typically, the amount of 4-vinyl pyridine-containing polymer is reported as weight percent (wt-%). Typically, the amount of 4-vinyl pyridine-containing polymer relative to the solvent is at least 5 wt-%, at least 10 wt-%, at least 15 wt-%, at least 20 wt-%, at least 25 wt-%, at least 30 wt-%, at least 40 wt-%, at least 50 wt-%, at least 60 wt-%, or at least 70 wt-% of 4-vinyl pyridine-containing polymer. Typically, the amount of 4-vinyl pyridine-containing polymer relative to the solvent is up to 10 wt-%, up to 20 wt-%, up to 30 wt-%, up to 40 wt-%, up to 45 wt-%, up to 50 wt-%, up to 55 wt-%, up to 60 wt-%, up to 65 wt-%, up to 70 wt-%, up to 80 wt-%, or up to 90 wt-%. In some embodiments, the amount of 4-vinyl pyridine-containing polymer relative to the solvent is in a range of 5 wt-% to 10 wt-%. In some embodiments, the amount of 4-vinyl pyridine-containing polymer relative to the solvent is 8 wt-%.

In some embodiments, the amount of 4-vinyl pyridine-containing polymer relative to the total weight of the composition including the polymer component, the solvent, and the epoxy is at least 1 wt-%, at least 2 wt-%, at least 5 wt-%, at least 10 wt-%, at least 15 wt-%, at least 20 wt-%, at least 25 wt-%, at least 30 wt-%, at least 40 wt-%, at least 50 wt-%, at least 60 wt-%, or at least 70 wt-% of 4-vinyl pyridine-containing polymer. Typically, the amount of 4-vinyl pyridine-containing polymer relative to the total weight of the composition is up to 5 wt-%, up to 10 wt-%, up to 20 wt-%, up to 30 wt-%, up to 40 wt-%, up to 45 wt-%, up to 50 wt-%, up to 55 wt-%, up to 60 wt-%, up to 65 wt-%, up to 70 wt-%, up to 80 wt-%, or up to 90 wt-%.

In some embodiments, the amount of 4-vinyl pyridine-containing polymer relative to the total weight of the polymer component is at least 5 wt-%, at least 10 wt-%, at least 15 wt-%, at least 20 wt-%, at least 25 wt-%, at least 30 wt-%, at least 40 wt-%, at least 50 wt-%, at least 60 wt-%, or at least 70 wt-% of 4-vinyl pyridine-containing polymer. In some embodiments, the amount of 4-vinyl pyridine-containing polymer relative to the total weight of the polymer component up to 40 wt-%, up to 45 wt-%, up to 50 wt-%, up to 55 wt-%, up to 60 wt-%, up to 65 wt-%, up to 70 wt-%, up to 80 wt-%, or up to 90 wt-%. In some embodiments, the amount of 4-vinyl pyridine-containing polymer relative to the total weight of the polymer component is in a range of 30 wt-% to 50 wt-% or in a range of 40 wt-% to 50 wt-%.

Typically, the amount of 4-vinyl pyridine-containing polymer relative to the total weight of the polymer solids in the polymer component is at least 5 wt-%, at least 10 wt-%, at least 15 wt-%, at least 20 wt-%, at least 25 wt-%, at least 30 wt-%, at least 40 wt-%, at least 50 wt-%, at least 60 wt-%, at least 70 wt-%, at least 80 wt-%, or at least 90 wt-% of 4-vinyl pyridine-containing polymer. Typically, the amount of 4-vinyl pyridine-containing polymer relative to the total weight of the polymer solids in the polymer component is up to 40 wt-%, up to 50 wt-%, up to 60 wt-%, up to 70 wt-%, up to 80 wt-%, up to 90 wt-%, or up to 100 wt-%. Typically, if present, the amount of non-4-vinyl pyridine-containing polymer is up to 40 wt-%, up to 50 wt-%, up to 60 wt-%, or up to 70 wt-%.

Solvent

In certain embodiments, the composition includes a solvent that does not complex with 4-vinyl pyridine. In some embodiments, the 4-vinyl pyridine-containing polymer and, if present, other polymers of the polymer component at least partially dissolve in the solvent. In some embodiments, the 4-vinyl pyridine-containing polymer and, if present, other polymers of the polymer component are dispersed in the solvent. In some embodiments, the epoxy at least partially dissolves in the solvent.

In some embodiments, a particularly preferred example of a solvent is ethanol. A particularly preferred example of a solvent that does not complex with 4-vinyl pyridine is ethanol. Other protic solvents that can be used include, for example, methanol, acetic acid, etc. In some embodiments, the solvent is an aprotic solvent such as, for example, dimethylformamide (DMF), dioxolane, tetrahydrofuran (THF), ethyl acetate, acetonitrile, dimethyl sulfoxide (DMSO), acetone, or mixtures thereof.

In some embodiments, the solvent can inhibit the reaction in the solution phase. A solvent that can inhibit the reaction in the solution phase may be able to complex with 4-vinyl pyridine. A solvent that can inhibit the reaction in the solution phase includes, for example, an aprotic solvent. For example, the solvent can be dioxolane. Although dioxolane inhibits the reaction in the solution phase, after the solvent is removed, e.g., during fiber spinning, the reaction will proceed.

In some embodiments, including, for example, where the fine fibers will be formed by electrospinning, it may be preferred to select the solvent or solvent blend such that the polymer component is soluble in the solvent or solvent blend.

Epoxy

The epoxy is at least difunctional. Suitable epoxies can include 1,4-butanediol diglycidyl ether; bisphenol A diglycidyl ether; bisphenol F epoxy resins; bisphenol A/F epoxy resins; modified bisphenol A epoxy resins; brominated epoxy resins, including those available under the tradename D.E.F. from Dow Chemicals; epoxy novolac resins, including those sold under the tradename D.E.N. from Dow Chemicals; epoxy phenol novolac resins, including those sold under the tradename EPN from Huntsman Chemicals; epoxy cresol novolac resins, including those sold under the tradename ECN from Huntsman Chemicals; difunctional cycloaliphatic epoxy resin, including those sold under the tradename ARALDITE CY from Huntsman Chemicals; glycidyl amine-type multifunctional epoxy resins, including those sold under the tradename ARALDITE MY from Hunstman chemicals; epoxy resins sold under the tradenames EPON, EPI-REZ, EPIKOTE, EPONOL, EPONEX from Momentive Chemicals; or combinations thereof (e.g., mixtures or copolymers thereof).

Formation of or Coating of Fine Fibers

Fine fibers of the present disclosure can be prepared by a method that includes: providing a polymer component, wherein the polymer component includes a 4-vinyl pyridine-containing polymer; providing a solvent; providing an epoxy, wherein the epoxy is at least difunctional; combining the polymer component, the solvent, and the epoxy to form a composition; and forming a plurality of fibers out of the composition. In certain embodiments, the entirety of each fiber is prepared from the composition.

Coated fine fibers of the present disclosure can be prepared by a method that includes: providing a polymer component, wherein the polymer component includes a 4-vinyl pyridine-containing polymer; providing a solvent; providing an epoxy, wherein the epoxy is at least difunctional; providing a pre-formed fiber; combining the polymer component, the solvent, and the epoxy to form a composition; and coating the fiber with the composition. The fibers to be coated may be made of any fine fiber forming-polymer material. Suitable examples include poly(4-vinyl pyridine), nylon, polyvinyl butyral (PVB), polyvinyl alcohol (PVA), polyurethane, polyamide terpolymer 651, etc., or combinations thereof (e.g., mixtures or copolymers thereof). Various combinations of polymers can be used if desired. The fibers may be coated by any appropriate method including, for example, dip coating, spray coating, aerosol deposition, etc.

In certain embodiments, the polymer component, the solvent, and the epoxy are combined to form a composition and a fiber is formed from the composition or a fiber is coated with the composition without increasing the temperature of the composition. In some embodiments, the polymer component, the solvent, and the epoxy are combined to form a composition and a fiber is formed from the composition or a fiber is coated with the composition without the direct application of heat from an external heat source. Preferably, the polymer component, the solvent, and the epoxy are at room temperature when they are combined. If a fiber is being coated, the fiber can be at room temperature when it coated with the composition. Preferably, the composition is at room temperature when the fiber is formed from or coated with the composition. In some embodiments, the polymer component, the solvent, and the epoxy are combined to form a composition and a fiber is formed from or a fiber is coated with the composition without increasing the temperature of the polymer component; the solvent; the epoxy; the composition including the polymer component, the solvent, and the epoxy; and/or the fiber above room temperature. In some embodiments, the temperature of the polymer component, the solvent, and/or the epoxy at the time of forming the composition is up to 30° C., up to 40° C., up to 50° C., up to 60° C., up to 70° C., or up to 80° C. In some embodiments, the polymer component, the solvent, and the epoxy are combined without increasing the temperature of the resulting composition above 30° C., above 40° C., above 50° C., above 60° C., above 70° C., or above 80° C. In some embodiments, a fiber is formed from or coated with the composition including the polymer component, the solvent, and the epoxy without increasing the temperature of the composition and/or the temperature of the fiber that is formed or coated above 30° C., above 40° C., above 50° C., above 60° C., above 70° C., or above 80° C.

In some embodiments when the polymer component, the solvent, and the epoxy are combined, the ratio of the weight of the polymer solids in the polymer component to the weight of the epoxy is between 1:0.4 and 1:1.5 (wt:wt). For example, in certain embodiments when the polymer component, the solvent, and the epoxy are combined, the ratio of the weight of the polymer solids in the polymer component to the weight of the epoxy is 1:0.4 (wt:wt), 1:0.6 (wt:wt), 1:0.8 (wt:wt), 1:1 (wt:wt), or 1:1.5 (wt:wt).

In some embodiments when the polymer component, the solvent, and the epoxy are combined, the molar ratio of 4-vinyl pyridine-containing polymer to epoxy is between 1:0.1 and 1:1.5. For example, in certain embodiments, the molar ratio of 4-vinyl pyridine-containing polymer to epoxy is 1:0.125, 1:0.18, 1:0.25, or 1:0.3.

In some embodiments when the polymer component, the solvent, and the epoxy are combined, the ratio of the weight of the 4-vinyl pyridine to the weight of the epoxy is between 1:0.4 and 1:1 (wt:wt). For example, in certain embodiments when the polymer component, the solvent, and the epoxy are combined, the ratio of the weight of the 4-vinyl pyridine to the weight of the epoxy is 1:0.4 (wt:wt), 1:0.6 (wt:wt), 1:0.8 (wt:wt) or 1:1 (wt:wt).

In some embodiments when the polymer component, the solvent, and the epoxy are combined, the molar ratio of 4-vinyl pyridine to epoxy is between 1:0.1 and 1:1.5. For example, in certain embodiments, the molar ratio of 4-vinyl pyridine to epoxy is 1:0.125, 1:0.18, 1:0.25, or 1:0.3.

In certain embodiments, the molar ratio of reactive groups in the 4-vinyl pyridine-containing polymer component (e.g., N) to reactive groups in the epoxy (e.g., glycidyl ether) is between 1:0.2 and 1:3. For example, in certain embodiments, the molar ratio of alkoxy-reactive groups to alkoxy groups is 1:0.25, 1:0.36, 1:0.5, or 1:0.06.

In some embodiments, the polymer component and the solvent are combined prior to being combined with the epoxy. In some embodiments, the polymer component and the solvent may be combined to form a solution prior to being combined with the epoxy.

In some embodiments, the polymer component and a solvent are mixed and then heated. The solvent can be a solvent that does not complex with 4-vinyl pyridine. In some embodiments, the mixture is heated until a solution is formed. In some embodiments, the polymer component and the solvent are heated up to 30° C., up to 40° C., up to 50° C., up to 60° C., up to 70° C., up to 80° C., or up to 100° C.

In some embodiments, a 4-vinyl pyridine-containing polymer and a solvent are mixed and then heated. The solvent can be a solvent that does not complex with 4-vinyl pyridine. In some embodiments, the mixture is heated until a solution is formed. In some embodiments, the mixture is heated up to 30° C., up to 40° C., up to 50° C., up to 60° C., up to 70° C., up to 80° C., or up to 100° C. If the polymer component includes another fiber-forming polymer material suitable for use in making fine fibers, this other fiber-forming polymer material may optionally be added after the 4-vinyl pyridine-containing polymer and the solvent are heated.

If previously heated, the polymer component and the solvent are cooled before combining the polymer component and the solvent with the epoxy. Preferably, the polymer component and the solvent are cooled to room temperature. In some embodiments, the polymer component and the solvent may be cooled to a temperature of up to 30° C., up to 40° C., up to 50° C., up to 60° C., up to 70° C., or up to 80° C.

In some embodiments, combining the polymer component, the solvent, and the epoxy to form a composition and forming a plurality of fibers out of the composition includes: mixing an epoxy, a solvent, and a polymer component that includes a 4-vinyl pyridine-containing polymer; allowing the 4-vinyl pyridine-containing polymer and epoxy to react; and removing at least a portion of the solvent. In some embodiments, the 4-vinyl pyridine-containing polymer and epoxy are allowed to react for at least 1 hour (60 minutes), at least 2 hours (120 minutes), at least 3 hours (180 minutes), or at least 4 hours (240 minutes) before at least a portion of the solvent is removed. The resulting fiber prepared from the composition includes the polymer component and the epoxy and may, optionally, include at least a portion of the solvent.

In some embodiments, combining the polymer component, the solvent, and the epoxy further includes controlling the ambient temperature and/or relative humidity present at the time of mixing the polymer component, the solvent, and the epoxy. In some embodiments, the ambient temperature may be at least 60° F., at least 70° F., at least 72° F., or at least 75° F. In some embodiments, the ambient temperature may be up to 70° F., up to 72° F., up to 75° F., up to 80° F., or up to 85° F. In some embodiments, the relative humidity, that is the ratio of the partial pressure of water vapor to the equilibrium vapor pressure of water at the same temperature, may be at least 8%, at least 10%, at least 12%, at least 15%, at least 18%, or at least 20%. In some embodiments, the relative humidity may be up to 10%, up to 12%, up to 15%, up to 20%, up to 30%, up to 40%, up to 50%, up to 80%, or up to 90%.

In some embodiments, combining the polymer component, the solvent, and the epoxy to form a composition and forming a plurality of fibers out of the composition are simultaneous. In some embodiments, combining the polymer component, the solvent, and the epoxy to form a composition and coating a fiber with the composition are simultaneous.

In some embodiments, after the fibers are formed or coated, the fibers may be stored. In some embodiments, the ambient temperature and/or relative humidity present during storage may be controlled. In some embodiments, the fibers may be stored in conditions having an ambient temperature of, for example, at least 60° F., at least 70° F., at least 72° F., or at least 75° F. and/or up to 70° F., up to 72° F., up to 75° F., up to 80° F., or up to 85° F. In some embodiments, the fibers may be stored in conditions having a relative humidity of at least 8%, at least 10%, at least 12%, at least 15%, at least 18%, or at least 20% and/or up to 10%, up to 12%, up to 15%, up to 20%, up to 30%, up to 40%, up to 50%, up to 80%, or up to 90%.

In some embodiments, for example, when the ambient temperatures and/or relative humidity present at the time of mixing the polymer component, the solvent, and the epoxy and/or present during storage of the fiber cannot be controlled, the fibers may be stored for a longer period before use; the weight of 4-vinyl pyridine-containing polymer relative to the total weight polymer component may be increased; and/or the weight of 4-vinyl pyridine-containing polymer relative to the weight of epoxy may be increased.

In certain embodiments, fine fibers of the present disclosure demonstrate at least 20%, at least 30%, at least 40%, at least 50%, or at least 60% fine fiber layer efficiency retained per the Ethanol Soak Test.

In certain embodiments, fine fibers of the present disclosure demonstrate at least 20%, at least 30%, at least 40%, at least 50%, or at least 60% fine fiber layer efficiency retained per the Hot Water Soak Test.

Fine fibers of the disclosure can be made using a variety of techniques including, for example, electrostatic spinning, centrifugal or rotary spinning, wet spinning, dry spinning, melt spinning, extrusion spinning, direct spinning, gel spinning, etc.

The fine fibers can be collected on a support layer during, for example, electrostatic or melt spinning formation. The support layer can be of any of a variety of porous materials, including fibrous materials, metal mesh, etc. Typically, fibrous materials used for the support layer are made of natural fiber and/or synthetic fibers. In certain embodiments, the support layer includes fibers having an average diameter of at least 5 microns, or at least 10 microns. In certain embodiments, the support layer can include fibers having an average diameter of up to 250 microns. In certain embodiments, the support layer is at least 0.005 inch (125 microns) thick, and often at least 0.01 inch (250 microns) thick. In certain embodiments, the support layer is up to 0.03 inch (750 microns) thick. In certain embodiments, the support layer has a Gurley stiffness of 100 grams or more.

Preferably, the layer of fine fiber material is disposed on a first surface of a layer of permeable coarse fibrous media (i.e., a support layer) as a layer of fiber. Also, preferably the first layer of fine fiber material disposed on the first surface of the first layer of permeable coarse fibrous material has an overall thickness that is no greater than 50 microns, more preferably no greater than 30 microns, even more preferably no more than 20 microns, and most preferably no greater than 10 microns. Typically and preferably, the thickness of the fine fiber layer is within a thickness of 1 to 20 times (often 1 to 8 times, and more preferably no more than 5 times) the fine fiber average diameter used to make the layer. In certain embodiments, the fine fiber layer has a thickness of at least 0.05 μm. In some embodiments, the fine fiber layer has a thickness of less than 200 microns.

Fine fibers of the disclosure can be made using the electrostatic spinning (i.e., electrospinning) process. A suitable electrospinning apparatus for forming the fine fibers includes a reservoir in which the fine fiber forming solution is contained, and an emitting device, which generally consists of a rotating portion including a plurality of offset holes. As it rotates in the electrostatic field, a droplet of the solution on the emitting device is accelerated by the electrostatic field toward the collecting media. Facing the emitter, but spaced apart therefrom, is a grid upon which the collecting media (i.e., a support layer or substrate) is positioned. Air can be drawn through the grid. A high voltage electrostatic potential is maintained between emitter and grid by means of a suitable electrostatic voltage source. The support layer is positioned in between the emitter and grid to collect the fibers.

Specifically, the electrostatic potential between grid and the emitter imparts a charge to the material which causes liquid to be emitted therefrom as thin fibers which are drawn toward the grid where they arrive and are collected on a substrate. In the case of the polymer in solution, a portion of the solvent is evaporated off the fibers during their flight to the substrate. The fine fibers bond to the substrate fibers as the solvent continues to evaporate and the fiber cools. Electrostatic field strength is selected to ensure that as the polymer material is accelerated from the emitter to the collecting media, the acceleration is sufficient to render the polymer material into a very thin microfiber or nanofiber structure. Increasing or slowing the advance rate of the collecting media can deposit more or less emitted fibers on the forming media, thereby allowing control of the thickness of each layer deposited thereon.

Alternatively, the electrospinning apparatus for forming fine fibers can be a pendant drop apparatus, i.e., a syringe filled with polymer solution. A high voltage is applied to the needle attached to the syringe and the polymer solution is pumped at a specified pump rate. As the drop of the polymer solution emerges from the needle, it forms a Taylor cone under the influence of the electrostatic field. At sufficiently high voltages, a jet is emitted from the Taylor cone which undergoes extension and fine fibers are formed and deposited on the media attached to a rotating mandrel which acts as the collector. Electrospinning processes usually use polymer solutions with 5-20% solids (on polymer) concentration.

Filter Media and Filter Elements

Fine fibers of the present disclosure can be formed into a filter structure such as filter media. In such a structure, the fine fiber materials of the disclosure are disposed on (typically, they are formed on and adhered to) a filter substrate (i.e., a filtration substrate). Natural fiber and synthetic fiber substrates can be used as the filter substrate. Examples include spunbonded or melt-blown supports or fabrics, wovens and nonwovens of synthetic fibers, cellulosic materials, and glass fibers. Plastic screen-like materials both extruded and hole punched, are other examples of filter substrates, as are ultra-filtration (UF) and micro-filtration (MF) membranes of organic polymers. Examples of synthetic nonwovens include polyester nonwovens, nylon nonwovens, polyolefin (e.g., polypropylene) nonwovens, or blended nonwovens thereof. Sheet-like substrates (e.g., cellulosic and/or synthetic nonwoven webs) are the typical form of the filter substrates. The shape and structure of the filter material, however, is typically selected by the design engineer and depends on the particular filtration application.

A filter media construction according to the present disclosure can include a layer of permeable coarse fibrous material (i.e., media or substrate) having a first surface. A first layer of fine fiber media is preferably disposed on the first surface of the layer of permeable coarse fibrous media.

Preferably, the layer of permeable coarse fibrous material includes fibers having an average diameter of at least 5 microns, and more preferably at least 12 microns, and even more preferably at least 14 microns. Preferably, the coarse fibers have an average diameter of no greater than 50 microns.

Also, preferably, the permeable coarse fibrous material comprises a media having a basis weight of no greater than 260 grams/meter$^2$ (g/m$^2$), and more preferably no greater than 150 g/m$^2$. Preferably, the permeable coarse fibrous material comprises a media having a basis weight of at least 0.5 g/m$^2$, and more preferably at least 8 g/m$^2$. Preferably, the first layer of permeable coarse fibrous media is at least 0.0005 inch (12 microns) thick, and more preferably at least 0.001 inch thick. Preferably, the first layer of permeable coarse fibrous media is no greater than 0.030 inch thick. Typically and preferably, the first layer of permeable coarse fibrous media is 0.001 inch to 0.030 inch (25 to 800 microns) thick. Preferably, the first layer of permeable coarse fibrous media has a Frazier permeability (differential pressure set at 0.5 inch of water) of at least 2 meters/minute (m/min). Preferably, the first layer of permeable coarse fibrous media has a Frazier permeability (differential pressure set at 0.5 inch of water) of no greater than 900 m/min.

In preferred arrangements, the first layer of permeable coarse fibrous material comprises a material which, if evaluated separately from a remainder of the construction by the Frazier permeability test, would exhibit a permeability of at least 1 m/min, and preferably at least 2 m/min. In preferred arrangements, the first layer of permeable coarse fibrous material comprises a material which, if evaluated separately from a remainder of the construction by the Frazier permeability test, would exhibit a permeability of no greater than 900 m/min, and typically and preferably 2 m/min to 900 m/min. Herein, when reference is made to efficiency or Low Efficiency Flat Sheet (LEFS) efficiency, unless otherwise specified, reference is meant to efficiency when measured according to ASTM-1215-89, with 0.78 micron (μ) monodisperse polystyrene spherical particles, at 20 feet per minute (fpm, 6.1 m/min) as described herein.

In these embodiments, a layer of fine fiber can be manufactured by forming a plurality of fine fibers on a filtration substrate, thereby forming a filter media. The filter media (i.e., fine fiber layer plus filtration substrate) can then be manufactured into filter elements (i.e., filtration elements), including, e.g., flat-panel filters, cartridge filters, or other filtration components. Examples of such filter elements are described in U.S. Pat. Nos. 6,746,517; 6,673,136; 6,800,117; 6,875,256; 6,716,274; and 7,316,723. The shape and structure of the filter material, however, is typically selected by the design engineer and depends on the particular filtration application.

EXEMPLARY METHODS OF MAKING A FIBER EMBODIMENTS

1. A method of making a fine fiber, the method comprising:
   providing a polymer component, wherein the polymer component comprises a 4-vinyl pyridine-containing polymer;
   providing a solvent that does not complex with 4-vinyl pyridine;
   providing an epoxy, wherein the epoxy is at least difunctional; and
   combining the polymer component, the solvent, and the epoxy to form a composition and forming a plurality of fibers out of the composition, such that the entirety of each fiber is prepared from the composition.
2. A method of making a fine fiber, the method comprising:
   providing a polymer component, wherein the polymer component comprises a 4-vinyl pyridine-containing polymer;
   providing a solvent;
   providing an epoxy, wherein the epoxy is at least difunctional; and
   combining the polymer component, the solvent, and the epoxy to form a composition and forming a plurality of fibers out of the composition, such that the entirety of each fiber is prepared from the composition without increasing the temperature of the composition above 80° C.
3. The method of either of embodiments 1 to 2, wherein the plurality of fibers are formed without increasing the temperature of the composition above 80° C. or above 30° C.
4. The method of any embodiments 1 to 3, wherein the polymer component, the solvent, and the epoxy are combined at room temperature and wherein the plurality of fibers are formed without increasing the temperature of the composition.
5. The method of any of embodiments 1 to 4, wherein the 4-vinyl pyridine-containing polymer comprises a poly (4-vinyl pyridine) homopolymer, a 4-vinyl pyridine copolymer, or a mixture thereof.
6. The method of embodiment 5, wherein the 4-vinyl pyridine-containing copolymer comprises a copolymer of a 4-vinyl pyridine and a comonomer comprising styrene, an alkyl(meth)acrylate, or acrylonitrile, or a combination thereof.
7. The method of any of embodiments 1 to 6, wherein the epoxy comprises 1,4-butanediol diglycidyl ether, bisphenol A diglycidyl ether, a bisphenol F epoxy resin, a bisphenol A/F epoxy resin, a modified bisphenol A epoxy resin, a brominated epoxy resin, an epoxy novolac resin, an epoxy phenol novolac resin, an epoxy cresol novolac resin, a difunctional cycloaliphatic epoxy resin, or a glycidyl amine-type multifunctional epoxy resin, or a combination thereof.
8. The method of any of embodiments 1 to 7, wherein the polymer component further comprises a nylon, a polyamide terpolymer, polyvinyl butyral (PVB), polyvinyl alcohol (PVA), or a polyurethane, or a combination thereof.
9. The method of embodiment 8, wherein the polymer component comprises a nylon, and further wherein the nylon comprises nylon-6; nylon-6,6; nylon-6,10; or terpolymers of nylon-6, nylon-6,6 and nylon-6,10; or a combination thereof.
10. The method of any of embodiments 1 to 9, wherein the solvent comprises a protic solvent.
11. The method of any of embodiments 1 to 10, wherein the solvent comprises ethanol.
12. The method of any of embodiments 1 to 11, wherein the solvent comprises an aprotic solvent.
13. The method of embodiment 12, wherein the aprotic solvent comprises dioxolane, tetrahydrofuran, ethyl acetate, acetonitrile, DMF, DMSO, or acetone, or a mixture thereof.
14. The method of any of embodiments 1 to 13, further comprising combining the polymer component and the solvent, and heating and then cooling the polymer component and the solvent before combining the polymer component, the solvent, and the epoxy.

15. The method of embodiment 14, wherein the polymer component and the solvent are cooled to room temperature.
16. The method of any of embodiments 2 to 15, wherein the solvent does not complex with 4-vinyl pyridine.
17. The method of any of embodiments 1 to 16, wherein combining the polymer component, the solvent, and the epoxy to form a composition and forming a plurality of fibers out of the composition comprises:
    mixing the polymer component, the solvent, and the epoxy;
    allowing the 4-vinyl pyridine-containing polymer and the epoxy to react; and
    removing at least a portion of the solvent.
18. The method of embodiment 17, wherein the 4-vinyl pyridine-containing polymer and the epoxy are allowed to react for at least 1 hour (60 minutes) before at least a portion of the solvent is removed.
19. The method of either of embodiments 17 or 18, wherein the 4-vinyl pyridine-containing polymer and the epoxy are allowed to react for at least 2 hours (120 minutes) before at least a portion of the solvent is removed.
20. The method of any of embodiments 17 to 19, wherein the 4-vinyl pyridine-containing polymer and the epoxy are allowed to react for at least 3 hours (180 minutes) before at least a portion of the solvent is removed.
21. The method of any of embodiments 1 to 20, wherein the solvent is ethanol.
22. The method of any of embodiments 1 to 21, wherein combining the polymer component, the solvent, and the epoxy to form a composition and forming a plurality of fibers out of the composition are simultaneous.
23. The method of any of embodiments 1 to 22, wherein forming a plurality of fibers out of the composition comprises electrospinning fibers.
24. The method of any of embodiments 1 to 23, wherein the polymer component comprises at least 20 wt-% of 4-vinyl pyridine-containing polymer based on polymer solids.
25. The method of any of embodiments 1 to 24, wherein the polymer component comprises at least 30 wt-% of 4-vinyl pyridine-containing polymer based on polymer solids.
26. The method of any of embodiments 1 to 25, wherein the molar ratio of 4-vinyl pyridine-containing polymer to epoxy is between 1:0.1 and 1:1.5.

EXEMPLARY METHODS OF MAKING A COATED FIBER EMBODIMENTS

1. A method of making a coated fine fiber, the method comprising:
    providing a polymer component, wherein the polymer component comprises a 4-vinyl pyridine-containing polymer;
    providing a solvent that does not complex with 4-vinyl pyridine;
    providing an epoxy, wherein the epoxy is at least difunctional;
    providing a fiber; and
    combining the polymer component, the solvent, and the epoxy to form a composition and coating the fiber with the composition.
2. A method of making a coated fine fiber, the method comprising:
    providing a polymer component, wherein the polymer component comprises a 4-vinyl pyridine-containing polymer;
    providing a solvent;
    providing an epoxy, wherein the epoxy is at least difunctional;
    providing a fiber; and
    combining the polymer component, the solvent, and the epoxy to form a composition and coating the fiber with the composition without increasing the temperature of the composition or the temperature of the fiber above 80° C.
3. The method of either of embodiments 1 or 2, wherein the fiber is coated without increasing the temperature of the composition or the temperature of the fiber above 80° C. or above 30° C.
4. The method of any of embodiments 1 to 3, wherein the polymer component, the solvent, and the epoxy are combined at room temperature and wherein the fiber is coated without increasing the temperature of the composition or the temperature of the fiber above room temperature.
5. The method of any of embodiments 1 to 4, wherein the 4-vinyl pyridine-containing polymer comprises a poly (4-vinyl pyridine) homopolymer, a 4-vinyl pyridine copolymer, or a mixture thereof.
6. The method of embodiment 5, wherein the 4-vinyl pyridine-containing copolymer comprises a copolymer of 4-vinyl pyridine and a comonomer comprising styrene, a alkyl(meth)acrylate, or acrylonitrile, or a combination thereof.
7. The method of any of embodiments 1 to 6, wherein the epoxy comprises 1,4-butanediol diglycidyl ether, bisphenol A diglycidyl ether, a bisphenol F epoxy resin, a bisphenol A/F epoxy resin, a modified bisphenol A epoxy resin, a brominated epoxy resin, an epoxy novolac resin, an epoxy phenol novolac resin, an epoxy cresol novolac resin, a difunctional cycloaliphatic epoxy resin, or a glycidyl amine-type multifunctional epoxy resin, or a combination thereof.
8. The method of any of embodiments 1 to 7, wherein the polymer component further comprises a nylon, a polyamide terpolymer, polyvinyl butyral (PVB), polyvinyl alcohol (PVA), or a polyurethane, or a combination thereof.
9. The method of embodiment 8, wherein the polymer component comprises a nylon, and further wherein the nylon comprises nylon-6; nylon-6,6; nylon-6,10; or terpolymers of nylon-6, nylon-6,6 and nylon-6,10; or a combination thereof.
10. The method of any of embodiments 1 to 9, wherein the solvent comprises a protic solvent.
11. The method of any of embodiments 1 to 10, wherein the solvent comprises ethanol.
12. The method of any of embodiments 1 to 11, wherein the solvent comprises an aprotic solvent.
13. The method of embodiment 12, wherein the aprotic solvent comprises dioxolane, tetrahydrofuran, ethyl acetate, acetonitrile, DMF, DMSO, or acetone, or a mixture thereof.
14. The method of any of embodiments 1 to 13, further comprising combining the polymer component and the solvent, and heating and then cooling the polymer component and the solvent before combining the polymer component, the solvent, and the epoxy.

15. The method of embodiment 14, wherein the polymer component and the solvent are cooled to room temperature.
16. The method of any of embodiments 2 to 15, wherein the solvent does not complex with 4-vinyl pyridine.
17. The method of any of embodiments 1 to 16, wherein combining the polymer component, the solvent, and the epoxy to form a composition and coating the fiber with the composition comprises:
    mixing the polymer component, the solvent, and the epoxy;
    allowing the 4-vinyl pyridine-containing polymer and epoxy to react; and
    removing at least a portion of the solvent.
18. The method of embodiment 17, wherein the 4-vinyl pyridine-containing polymer and epoxy are allowed to react for at least 1 hour (60 minutes) before at least a portion of the solvent is removed.
19. The method of either of embodiments 17 or 18, wherein the 4-vinyl pyridine-containing polymer and epoxy are allowed to react for at least 2 hours (120 minutes) before at least a portion of the solvent is removed.
20. The method of any of embodiments 17 to 19, wherein the 4-vinyl pyridine-containing polymer and epoxy are allowed to react for at least 3 hours (180 minutes) before at least a portion of the solvent is removed.
21. The method of any of embodiments 1 to 20, wherein the solvent is ethanol.
22. The method of any of embodiments 1 to 21, wherein combining the polymer component, the solvent, and the epoxy to form a composition and coating the fiber with the composition are simultaneous.
23. The method of any of embodiments 1 to 22, wherein coating the fiber with the composition comprises dip coating, spray coating, or aerosol deposition.
24. The method of any of embodiments 1 to 23, wherein the polymer component comprises at least 20 wt-% of 4-vinyl pyridine-containing polymer based on polymer solids.
25. The method of any of embodiments 1 to 24, wherein the polymer component comprises at least 30 wt-% of 4-vinyl pyridine-containing polymer based on polymer solids.
26. The method of any of embodiments 1 to 25, wherein the molar ratio of 4-vinyl pyridine-containing polymer to epoxy is between 1:0.1 and 1:1.5.

EXEMPLARY FIBER EMBODIMENTS

1. A fine fiber wherein the entirety of the fiber comprises a composition, the composition comprising the reaction product of a 4-vinyl pyridine-containing polymer and an epoxy, wherein the epoxy is at least difunctional.
2. The fine fiber of claim 1, wherein the 4-vinyl pyridine-containing polymer comprises a poly(4-vinyl pyridine) homopolymer, a 4-vinyl pyridine copolymer, or a mixture thereof.
3. The fine fiber of claim 2, wherein the 4-vinyl pyridine copolymer comprises a copolymer of 4-vinyl pyridine and a comonomer comprising styrene, a alkyl(meth) acrylate, or acrylonitrile, or a combination thereof.
4. The fine fiber of any of claims 1 to 3, wherein the epoxy comprises 1,4-butanediol diglycidyl ether, bisphenol A diglycidyl ether, a bisphenol F epoxy resin, a bisphenol A/F epoxy resin, a modified bisphenol A epoxy resin, a brominated epoxy resin, an epoxy novolac resin, an epoxy phenol novolac resin, an epoxy cresol novolac resin, a difunctional cycloaliphatic epoxy resin, or a glycidyl amine-type multifunctional epoxy resin, or a combination thereof.
5. The fine fiber of any of embodiments 1 to 4, wherein the composition further comprises a nylon, a polyamide terpolymer, polyvinyl butyral (PVB), polyvinyl alcohol (PVA), or a polyurethane, or a combination thereof.
6. The fine fiber of embodiment 5, wherein the composition comprises a nylon, and further wherein the nylon comprises nylon-6; nylon-6,6; nylon-6,10; or terpolymers of nylon-6, nylon-6,6 and nylon-6,10; or a combination thereof.
7. The fine fiber of any of embodiments 1 to 6, wherein the polymer component comprises at least 20 wt-% of the 4-vinyl pyridine-containing polymer based on polymer solids.
8. The fine fiber of any of embodiments 1 to 7, wherein the polymer component comprises at least 30 wt-% of the 4-vinyl pyridine-containing polymer based on polymer solids.
9. The fine fiber of any of embodiments 1 to 8, wherein the molar ratio of 4-vinyl pyridine-containing polymer to epoxy is between 1:0.1 and 1:1.5.

EXEMPLARY FILTER MEDIA AND FILTER ELEMENT EMBODIMENTS

1. A filter media comprising a plurality of the fibers of any of the embodiments disclosed herein.
2. A liquid filtration medium comprising a plurality of the fibers of any of the embodiments disclosed herein.
3. An air filtration medium comprising a plurality of the fibers of any of the embodiments disclosed herein.
4. The filter media of embodiment 1 further comprising a filtration substrate, wherein the plurality of fibers is disposed on the substrate to form a fine fiber layer.
5. The filter media of embodiment 4, wherein the fine fiber layer has a thickness of less than or equal to 200 microns.
6. The filter media of either of embodiments 4 or 5, wherein the filtration substrate comprises a nonwoven substrate.
7. The filter media of any of embodiments 4 to 6, wherein the fine fiber layer is an electrospun layer and the filtration substrate comprises a cellulosic, cellulose/synthetic blend, or synthetic nonwoven.
8. The filter media of any of embodiments 4 to 7, wherein the filtration substrate comprises at least one of a polyester nonwoven, a polyolefin nonwoven, and a blended nonwoven.
9. The filter media of any of embodiments 4 to 8, wherein the filtration substrate comprises a spunbound support.
10. A filter element comprising filter media of any one of embodiments 4 to 9.

EXEMPLARY PRODUCT-BY-PROCESS EMBODIMENTS

1. A fine fiber prepared by a method comprising:
    providing a polymer component, wherein the polymer component comprises a 4-vinyl pyridine-containing polymer;
    providing a solvent that does not complex with 4-vinyl pyridine;
    providing an epoxy, wherein the epoxy is at least difunctional;

combining the polymer component, the solvent, and the epoxy to form a composition and forming a plurality of fibers out of the composition, such that the entirety of each fiber is prepared from the composition.

2. A fine fiber prepared by a method comprising:
providing a polymer component, wherein the polymer component comprises a 4-vinyl pyridine-containing polymer;
providing a solvent;
providing an epoxy, wherein the epoxy is at least difunctional;
combining the polymer component, the solvent, and the epoxy to form a composition and forming a plurality of fibers out of the composition, such that the entirety of each fiber is prepared from the composition without increasing the temperature of the composition above 80° C.

3. A coated fine fiber prepared by a method comprising:
providing a polymer component, wherein the polymer component comprises a 4-vinyl pyridine-containing polymer;
providing a solvent that does not complex with 4-vinyl pyridine;
providing an epoxy, wherein the epoxy is at least difunctional;
providing a fiber;
combining the polymer component, the solvent, and the epoxy to form a composition and coating the fiber with the composition.

4. A coated fine fiber prepared by a method comprising:
providing a polymer component, wherein the polymer component comprises a 4-vinyl pyridine-containing polymer;
providing a solvent;
providing an epoxy, wherein the epoxy is at least difunctional;
providing a fiber; and
combining the polymer component, the solvent, and the epoxy to form a composition and coating the fiber with the composition without increasing the temperature of the composition or the temperature of the fiber above 80° C.

5. The fine fiber of any of embodiments 1 to 4, wherein the solvent comprises a protic solvent.

6. The fine fiber of any of embodiments 1 to 5, wherein the solvent comprises ethanol.

7. The fine fiber of any of embodiments 1 to 6, wherein the solvent comprises an aprotic solvent.

8. The fine fiber of embodiment 7, wherein the aprotic solvent comprises dioxolane, tetrahydrofuran, ethyl acetate, acetonitrile, DMF, DMSO, or acetone, or a mixture thereof.

9. The fine fiber of any of embodiments 1 to 8, wherein the 4-vinyl pyridine-containing polymer comprises a poly(4-vinyl pyridine) homopolymer, a 4-vinyl pyridine copolymer, or a mixture thereof.

10. The fine fiber of embodiment 9, wherein the 4-vinyl pyridine-containing copolymer comprises a copolymer of a 4-vinyl pyridine and a comonomer comprising styrene, an alkyl(meth)acrylate, or acrylonitrile, or a combination thereof.

11. The fine fiber of any of embodiments 1 to 10, wherein the epoxy comprises 1,4-butanediol diglycidyl ether, bisphenol A diglycidyl ether, a bisphenol F epoxy resin, a bisphenol A/F epoxy resin, a modified bisphenol A epoxy resin, a brominated epoxy resin, an epoxy novolac resin, an epoxy phenol novolac resin, an epoxy cresol novolac resin, a difunctional cycloaliphatic epoxy resin, or a glycidyl amine-type multifunctional epoxy resin, or a combination thereof.

12. The fine fiber of any of embodiments 1 to 11, wherein the polymer component further comprises a nylon, a polyamide terpolymer, polyvinyl butyral (PVB), polyvinyl alcohol (PVA), or a polyurethane, or a combination thereof.

13. The fine fiber of embodiment 12, wherein the polymer component comprises a nylon, and further wherein the nylon comprises nylon-6; nylon-6,6; nylon-6,10; or terpolymers of nylon-6, nylon-6,6 and nylon-6,10; or a combination thereof.

14. The fine fiber of any of embodiments 1 to 13, wherein the method further comprises mixing the polymer component and the solvent, and heating and then cooling the polymer component and the solvent before combining the polymer component, the solvent, and the epoxy.

15. The fine fiber of embodiment 14, wherein the polymer component and the solvent are cooled to room temperature.

16. The fine fiber of any of embodiments 1 to 15, wherein the solvent does not complex with 4-vinyl pyridine.

17. The fine fiber of any of embodiments 1 to 16, wherein combining the polymer component, the solvent, and the epoxy to form a composition and forming a plurality of fibers out of the composition comprises:
mixing the polymer component, the solvent, and the epoxy;
allowing the 4-vinyl pyridine-containing polymer and the epoxy to react; and
removing at least a portion of the solvent.

18. The fine fiber of embodiment 17, wherein the 4-vinyl pyridine-containing polymer and the epoxy are allowed to react for at least 1 hour (60 minutes) before at least a portion of the solvent is removed.

19. The fine fiber of either of embodiments 17 or 18, wherein the 4-vinyl pyridine-containing polymer and the epoxy are allowed to react for at least 2 hours (120 minutes) before at least a portion of the solvent is removed.

20. The fine fiber of any of embodiments 17 to 19, wherein the 4-vinyl pyridine-containing polymer and the epoxy are allowed to react for at least 3 hours (180 minutes) before at least a portion of the solvent is removed.

21. The fine fiber of any of embodiments 1 to 20, wherein the solvent is ethanol.

22. The fine fiber of any of embodiments 1 to 21, wherein combining the polymer component, the solvent, and the epoxy to form a composition and forming a plurality of fibers out of the composition are simultaneous.

23. The fine fiber of any of embodiments 1 to 22, wherein forming a plurality of fibers out of the composition comprises electrospinning fibers.

24. The fine fiber of any of embodiments 1 to 23, wherein the polymer component comprises at least 20 wt-% of 4-vinyl pyridine-containing polymer based on polymer solids.

25. The fine fiber of any of embodiments 1 to 24, wherein the polymer component comprises at least 30 wt-% of 4-vinyl pyridine-containing polymer based on polymer solids.

26. The fine fiber of any of embodiments 1 to 25, wherein the molar ratio of 4-vinyl pyridine-containing polymer to epoxy is between 1:0.1 and 1:1.5.

EXAMPLES

Objects and advantages of this disclosure are further illustrated by the following examples, but the particular materials and amounts thereof recited in these examples, as well as other conditions and details, should not be construed to unduly limit this disclosure.

Table of Materials Used in Examples

| Name (as listed in literature/manufacturer) | Name as used in examples | Obtained from |
|---|---|---|
| Poly(4-vinyl pyridine) | P4VP | Scientific Polymer |
| bisphenol A diglycidyl ether | BADGE | Sigma Aldrich Chemicals |
| SVP651/Isocor 651 | polyamide terpolymer 651 | Shakespeare Co./Jarden Applied Materials |

TEST PROCEDURES

Measurement of Filtration Efficiency

Filter media (substrate+fine fiber) efficiency is measured and reported as Low Efficiency Flat Sheet (LEFS) efficiency. LEFS efficiency refers to the removal efficiency for 0.78 micron latex particles at a face velocity of 20 feet/minute (ft/min) when tested according to ASTM-1215-89.

Ethanol Soak Test

LEFS efficiency is measured for a sample of fine fibers in the form of a layer disposed on a substrate. After the measurement, the sample is submerged in ethanol (190 proof) under ambient conditions for 1 min. The sample is removed, dried, and the LEFS efficiency is re-measured. The sample is evaluated for the amount of fine fiber layer efficiency retained as determined according to the procedure described in U.S. Pat. No. 6,743,273 ("Fine fiber layer efficiency retained"). Results can be reported either simply as LEFS efficiency or as the fine fiber layer retained. The amount of fine fiber layer efficiency retained is reported as a percentage of the initial amount of fine fibers and referred to as "fine fiber layer efficiency retained." This percentage gives a good indication of whether the degree of crosslinking achieved was sufficient to protect the fine fiber material from attack/dissolution or delamination by ethanol.

Hot Water Soak Test

This test is very similar to the ethanol soak test described above except for the fact that the sample is submerged in hot water (140° F.) for 5 minutes. The sample is removed, dried, and evaluated for the amount of fine fiber layer efficiency retained as described above and according to the procedure described in U.S. Pat. No. 6,743,273 ("Fine fiber layer efficiency retained"). The amount of fine fiber layer efficiency gives a good indication of whether the degree of crosslinking achieved was sufficient to protect the fine fiber material from attack/dissolution by hot water.

PREPARATION METHODS

Example 1

A polymer mixture containing poly(4-vinyl pyridine) (P4VP) and ethanol was prepared by mechanical stirring to produce an 8% solids solution without the application of heat (that is, without any thermal input). After complete dissolution of the P4VP, bisphenol A diglycidyl ether (BADGE) was added while maintaining mechanical stirring. The weight ratio of poly(4-vinyl pyridine) to BADGE was 1:0.8 (wt:wt) or 1:1 (wt:wt). The solution was allowed to react for 4 hours and was then electrospun using the pendant drop electrospinning technique to form a layer of fine fiber on a filtration substrate. For this example, a voltage of 30 KV to 40 KV was used to form the fine fiber layer on substrate material moving at a distance of 4 inches from the emitter. The substrate was a flat cellulose media (EN848, Hollingsworth & Vose, East Walpole, MA) with an average basis weight of 83 g/m$^2$, average thickness of 0.29 mm, and average Frazier permeability of 6.7 m/min.

Ethanol soak test and the hot water soak tests were performed on disks cut from the fine fiber laden substrate after 1 day, 3 days, 7 days, and 18 days. The samples were stored at ambient temperature and humidity conditions. Samples that were subjected to post treatment (PT) (130° C. for 10 minutes) to force the reaction to completion served as control samples. FIG. 1 shows the fine fiber layer efficiency retained post-ethanol soak and post-hot water soak.

Example 2

Example 1 was repeated again; however, the ratios of P4VP to BADGE employed were 1:0.4; 1:0.6; 1:0.8 and 1:1 and the reaction time in the solution after the addition of epoxy was decreased to 3 hours. Ethanol soak test and hot water soaks test were performed on sample disks that had been stored under ambient temperature and humidity condition for 0 days (immediately after electrospinning), 1 day, 3 days, 7 days, and 22 days. Samples post treated (PT) by heating at 130° C. for 10 minutes served as control samples. FIG. 2 shows the fine fiber layer efficiency retained post-ethanol soak and post-hot water soak.

Example 3

As in Examples 1 and 2, mixtures were prepared with P4VP:BADGE; however, the ratios of P4VP to BADGE employed were 1:0.6; 1:0.7; 1:0.8; 1:0.9, and 1;1. In addition, an additional polymer mixture containing P4VP and a dioxolane and ethanol solution having a dioxolane:ethanol ratio=30:70 (vol/vol) was prepared by mechanical stirring to product an 8% solids solution without the application of heat (that is, without any thermal input). The solution was allowed to react for 3 hours and was then electrospun as described in Example 1.

Ethanol soak and hot water soak tests were performed on sample disks that had been stored under ambient temperature and humidity condition for 0 days (immediately after electrospinning), 1 day, 3 days, 11 days, and 22 days. Additionally, samples post treated (PT) to 130° C. for 10 minutes served as control samples. FIG. 3 shows the fine fiber layer efficiency retained post-ethanol soak and post-hot water soak.

Example 4

Polymer solutions containing poly(4-vinyl pyridine) (P4VP), polyamide terpolymer 651, and ethanol were prepared and heated to 60° C. to produce a 8% solids solution. The ratios of 651:P4VP used were 30:70 and 52:48 (wt:wt). After cooling to room temperature, bisphenol A diglycidyl ether (BADGE) was added such that the ratio of P4VP:

BADGE=1:0.8. The solution was allowed to react for 4 hours with agitation and then electrospun using the pendant drop electrospinning technique to form a layer of fine fiber on a filtration substrate. For this example, a voltage of 40 KV was used to form the fine fiber layer on substrate material at a distance of 4 inches from the emitter. The substrate was a flat cellulose media (EN848, Hollingsworth & Vose, East Walpole, MA) with an average basis weight of 83 g/m$^2$, average thickness of 0.29 mm, and average Frazier permeability of 6.7 m/min.

Ethanol soak tests and the hot water soak tests were performed on disks cut from the fine fiber laden substrate after 0 days, 1 day, 5 days, 13 days, and 21 days. The samples were stored at ambient temperature and humidity conditions. Samples post treated (PT) to 130° C. for 10 minutes served as control samples. FIG. 4 shows the fine fiber layer efficiency retained post-ethanol soak and post-hot water soak.

Example 5

Example 4 was repeated; however, blend ratios of 651:P4VP used were 30:70; 52:48, and 70:30. In addition, a control solution was prepared including polyamide terpolymer 651:P4VP=52:48 to which no BADGE was added (i.e., P4VP:BADGE=1:0).

Ethanol soak and hot water soak tests were performed on disks that were kept at ambient temperature and humidity condition for 0 days, 1 day, 3 days, 7 days, and 21 days. Samples post treated (PT) to 130° C. for 10 minutes served as control samples. FIG. 5 shows the fine fiber layer efficiency retained post-ethanol soak and post-hot water soak.

Example 6

Example 4 was repeated again; however, blend ratios of 651:P4VP=52:48; 60:40; 70:30; 80:20; 90:10 and 100:0 (no P4VP) were used. In addition, a control solution was prepared including only the nylon terpolymer (polyamide terpolymer 651) but no P4VP and no epoxy (BADGE).

Ethanol and hot water soak tests were performed on disks that were kept at ambient temperature and humidity condition for 0 days, 1 day, 5 days, and 12 days. Samples post treated (PT) to 130° C. for 10 minutes served as control samples. FIG. 6 shows the fine fiber layer efficiency retained post-ethanol soak and post-hot water soak.

Example 7

Polymer solutions containing poly(4-vinyl pyridine) (P4VP), polyamide terpolymer 651, and ethanol were prepared and heated to 60° C. to produce a 8% solids solution. The ratio of 651:P4VP was 60:40 (wt:wt). After cooling to room temperature, bisphenol A diglycidyl ether (BADGE) was added such that the ratio of P4VP:BADGE was 1:0.8. or 1:1. The solution was allowed to react for 4 hours with agitation and then electrospun using the pendant drop electrospinning technique to form a layer of fine fiber on a filtration substrate. For this example, a voltage of 40 KV was used to form the fine fiber layer on substrate material at a distance of 4 inches from the emitter. The substrate was a flat cellulose media (EN848, Hollingsworth & Vose, East Walpole, MA) with an average basis weight of 83 g/m$^2$, average thickness of 0.29 mm, and average Frazier permeability of 6.7 m/min.

Ethanol soak tests and the hot water soak tests were performed on disks cut from the fine fiber laden substrate after 0 days, 1 day, 5 days, 13 days, and 21 days. The samples were stored at either ambient temperature and humidity conditions or in a conditioned room having a temperature of 72° F. and a humidity of 10% to 12%. Samples post treated (PT) to 130° C. for 10 minutes served as control samples. FIG. 7 shows the fine fiber layer efficiency retained post-ethanol soak and post-hot water soak.

The complete disclosure of all patents, patent applications, and publications, cited herein are incorporated by reference. In the event that any inconsistency exists between the disclosure of the present application and the disclosure(s) of any document incorporated herein by reference, the disclosure of the present application shall govern. The foregoing detailed description and examples have been given for clarity of understanding only No unnecessary limitations are to be understood therefrom. The invention is not limited to the exact details shown and described, for variations obvious to one skilled in the art will be included within the invention defined by the claims.

The invention claimed is:

1. A method of making a fiber, the method comprising:

combining a polymer component, a solvent, and an epoxy to form a composition, the polymer component comprising a 4-vinyl pyridine-containing polymer and the epoxy being at least difunctional, wherein the solvent does not complex with 4-vinyl pyridine;

forming a fiber such that the entirety the fiber is prepared from the composition; and causing the 4-vinyl pyridine-containing polymer and the epoxy in the fiber to crosslink at a temperature below 80° C.

2. The method of claim 1, wherein the fiber has a diameter in a range of 0.05 μm to 10 μm.

3. The method of claim 1, wherein the fiber is formed by electrostatic spinning, centrifugal or rotary spinning, wet spinning, dry spinning, melt spinning, extrusion spinning, direct spinning, or gel spinning.

4. The method of claim 1, further comprising removing at least a portion of the solvent.

5. The method of claim 1, wherein the polymer component comprises at least 5 wt-% of 4-vinyl pyridine-containing polymer based on polymer solids.

6. The method of claim 1, wherein the epoxy comprises 1,4-butanediol diglycidyl ether, bisphenol A diglycidyl ether, a bisphenol F epoxy resin, a bisphenol A/F epoxy resin, a modified bisphenol A epoxy resin, a brominated epoxy resin, an epoxy novolac resin, an epoxy phenol novolac resin, an epoxy cresol novolac resin, a difunctional cycloaliphatic epoxy resin, or a glycidyl amine-type multifunctional epoxy resin, or a combination thereof.

7. The method of claim 1, wherein the polymer component further comprises a nylon, a polyamide terpolymer, polyvinyl butyral (PVB), polyvinyl alcohol (PVA), or a polyurethane, or a combination thereof.

8. The method of claim 1, wherein the 4-vinyl pyridine-containing polymer comprises a poly(4-vinyl pyridine) homopolymer, a 4-vinyl pyridine copolymer, or a mixture thereof.

9. The method of claim 1, wherein the solvent comprises an aprotic solvent, ethanol, or a combination thereof.

10. A method of making a fiber, the method comprising:

preparing a composition by mixing a 4-vinyl pyridine-containing polymer with an epoxy and a solvent at a polymer-to-epoxy ratio of 1:0.4 to 1:1;

forming a fiber from the composition; and allowing the 4-vinyl pyridine-containing polymer and the epoxy in the fiber to crosslink at a temperature of no greater than 80° C., wherein the epoxy is at least difunctional and the solvent does not complex with 4-vinyl pyridine.

11. The method of claim 10, wherein the fiber has a diameter in a range of 0.05 μm to 10 μm.

12. The method of claim 10, wherein the fiber is formed by electrostatic spinning, centrifugal or rotary spinning, wet spinning, dry spinning, melt spinning, extrusion spinning, direct spinning, or gel spinning.

13. The method of claim 10, further comprising removing at least a portion of the solvent.

14. The method of claim 10, wherein the polymer component comprises at least 5 wt-% of 4-vinyl pyridine-containing polymer based on polymer solids.

15. The method of claim 10, wherein the epoxy comprises 1,4-butanediol diglycidyl ether, bisphenol A diglycidyl ether, a bisphenol F epoxy resin, a bisphenol A/F epoxy resin, a modified bisphenol A epoxy resin, a brominated epoxy resin, an epoxy novolac resin, an epoxy phenol novolac resin, an epoxy cresol novolac resin, a difunctional cycloaliphatic epoxy resin, or a glycidyl amine-type multi-functional epoxy resin, or a combination thereof.

16. The method of claim 10, wherein the polymer component further comprises a nylon, a polyamide terpolymer, polyvinyl butyral (PVB), polyvinyl alcohol (PVA), or a polyurethane, or a combination thereof.

17. The method of claim 10, wherein the 4-vinyl pyridine-containing polymer comprises a poly(4-vinyl pyridine) homopolymer, a 4-vinyl pyridine copolymer, or a mixture thereof.

18. The method of claim 10, wherein the solvent comprises an aprotic solvent, ethanol, or a combination thereof.

19. A filter media comprising fibers formed by a method comprising:

preparing a composition by mixing a 4-vinyl pyridine-containing polymer with an epoxy and a solvent at a polymer-to-epoxy ratio of 1:0.4 to 1:1;

forming a fiber from the composition; and allowing the 4-vinyl pyridine-containing polymer and the epoxy in the fiber to crosslink at a temperature of no greater than 80° C., wherein the epoxy is at least difunctional and the solvent does not complex with 4-vinyl pyridine.

20. The filter media of claim 19, wherein the epoxy comprises 1,4-butanediol diglycidyl ether, bisphenol A diglycidyl ether, a bisphenol F epoxy resin, a bisphenol A/F epoxy resin, a modified bisphenol A epoxy resin, a brominated epoxy resin, an epoxy novolac resin, an epoxy phenol novolac resin, an epoxy cresol novolac resin, a difunctional cycloaliphatic epoxy resin, or a glycidyl amine-type multi-functional epoxy resin, or a combination thereof, and wherein the polymer component further comprises a nylon, a polyamide terpolymer, polyvinyl butyral (PVB), polyvinyl alcohol (PVA), or a polyurethane, or a combination thereof.

* * * * *